US012797821B2

(12) United States Patent
Zhao et al.

(10) Patent No.: US 12,797,821 B2
(45) Date of Patent: Nov. 17, 2026

(54) METAL-DOPED COVALENT ORGANIC FRAMEWORKS

(71) Applicants: EXXONMOBIL TECHNOLOGY AND ENGINEERING COMPANY, Annandale, NJ (US); National University of Singapore, Singapore (SG)

(72) Inventors: Dan Zhao, Singapore (SG); Chengjun Kang, Singapore (SG); Yuxiang Wang, Singapore (SG); Zhaoqiang Zhang, Singapore (SG); Lisa S. Baugh, Ringoes, NJ (US); Edward W. Corcoran, Jr., Nazareth, PA (US); David C. Calabro, Bridgewater, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 319 days.

(21) Appl. No.: 18/681,483

(22) PCT Filed: Jun. 3, 2022

(86) PCT No.: PCT/US2022/032225
§ 371 (c)(1),
(2) Date: Feb. 5, 2024

(87) PCT Pub. No.: WO2023/014433
PCT Pub. Date: Feb. 9, 2023

(65) Prior Publication Data

US 2026/0145157 A1 May 28, 2026

Related U.S. Application Data

(60) Provisional application No. 63/228,890, filed on Aug. 3, 2021.

(51) Int. Cl.
*B01J 20/22* (2006.01)
*B01D 53/02* (2006.01)
(Continued)

(52) U.S. Cl.
CPC ............ *B01J 20/226* (2013.01); *B01D 53/02* (2013.01); *B01J 20/28033* (2013.01);
(Continued)

(58) Field of Classification Search
CPC ...................................................... B01J 20/226
See application file for complete search history.

(56) References Cited

U.S. PATENT DOCUMENTS

| | | | |
|---|---|---|---|
| 2010/0064888 A1 | 3/2010 | Schubert et al. | |
| 2010/0143693 A1 | 6/2010 | Yaghi et al. | |

(Continued)

FOREIGN PATENT DOCUMENTS

| | | |
|---|---|---|
| AU | 2021205982 A1 | 7/2022 |
| CA | 3167046 A1 | 7/2021 |

(Continued)

OTHER PUBLICATIONS

Office action received for Canadian Patent Application No. 3227867, mailed on Feb. 3, 2025, 3 pages.

(Continued)

*Primary Examiner* — Robert Clemente
(74) *Attorney, Agent, or Firm* — Shook, Hardy & Bacon L.L.P.

(57) ABSTRACT

Compositions are provided corresponding to covalent organic framework materials that are doped with selected metal ions. The selected metal ions can correspond to metal ions that can both a) form a bonding complex with functional groups in the COF material, and b) after forming the bonding complex with the functional group, can further form a modified sorption complex with the imine group and
(Continued)

a sorbed component, such as a $CO_2$. As a result, the metal ion-doped organic framework materials can have unexpected sorption properties for sorption of components such as $CO_2$. The metal ions can be selected in part based on "hard soft acid base" theory. Methods of sorption of components from gas phase flows are also provided.

15 Claims, 20 Drawing Sheets

(51) Int. Cl.
*B01J 20/28* (2006.01)
*B01J 20/30* (2006.01)
*C07F 15/02* (2006.01)

(52) U.S. Cl.
CPC ... *B01J 20/28042* (2013.01); *B01J 20/28059* (2013.01); *B01J 20/3071* (2013.01); *B01J 20/3085* (2013.01); *C07F 15/025* (2013.01); *B01D 2253/204* (2013.01); *B01D 2253/306* (2013.01); *B01D 2253/342* (2013.01); *B01D 2257/504* (2013.01)

(56) References Cited

U.S. PATENT DOCUMENTS

2016/0107980 A1 4/2016 Johns et al.
2016/0175765 A1* 6/2016 Tai .................... B01D 53/0462 96/115
2017/0151549 A1 6/2017 Long et al.
2018/0319821 A1* 11/2018 Yaghi ................... C07D 471/04
2022/0370981 A1 11/2022 Yaghi et al.

FOREIGN PATENT DOCUMENTS

CN 107362829 A 11/2017
CN 108794756 A 11/2018
CN 114981335 A 8/2022
EP 4087893 A1 11/2022
JP 2010-508321 A 3/2010
JP 2010-516869 A 5/2010
JP 2015-504000 A 2/2015
JP 2023-510346 A 3/2023
WO 2008/091976 A1 7/2008
WO 2021/142474 A1 7/2021

OTHER PUBLICATIONS

Notice of Acceptance received for Australian Patent Application No. 2022324285, mailed on Aug. 12, 2025, 3 pages.
Office Action received for Japanese Patent Application No. 2024-506836, mailed on Oct. 14, 2025, 10 pages (5 pages of English Translation and 5 pages of Original Office Action).
Ascherl et al., "Solvatochromic Covalent Organic Frameworks", Nature Communications, vol. 9, No. 3802, Sep. 18, 2018, pp. 1-8.
Office Action received for Chinese Patent Application No. 202280051297.7, mailed on Dec. 29, 2025, 13 pages (5 pages of English Translation and 8 pages of Original Office Action).
Office Action received for Korean Patent Application No. 10-2024-7003989, mailed on Dec. 9, 2025, 17 pages (8 pages of English Translation and 9 pages of Original Office Action).
Jing H. et al., "Functionalization of covalent organic frameworks by metal modification: Construction, properties and applications", Chemical Engeneering Journal, vol. 404, Sep. 25, 2020, XP086326322.
Yong L. et al., "Supporting Information for Three-dimensional porphyrin-based covalent organic frameworks with tetrahedral building blocks for single-site catalysis Contents", New Journal of Chemistry, Oct. 9, 2019, pp. 1-38.
Yong L. et al., "Three-dimensional porphyrin-based covalent organic frameworks with tetrahedral building blocks for single-site catalysis", New Journal Of Chemistry, [Online] vol. 43, No. 43, Oct. 2, 2019, pp. 16907-16914.
Office Action received for Australian Patent Application No. 2022324285, mailed on Apr. 16, 2025, 4 pages.
Office action received for Japanese Patent Application No. 2024-506836, mailed on Mar. 5, 2025, 8 pages (4 pages of Original OA and 4 pages of English Translation).
Notice of Allowance received for Canadian Patent Application No. 3227867, mailed on Apr. 8, 2026, 1 page.
Office action received for Japanese Patent Application No. 2024-506836, mailed on May 12, 2026, 8 pages (3 pages of Original OA and 5 pages of English Translation).
Wei et al., "Atomically dispersed Fe atoms anchored on COFderived N-doped carbon nanospheres as efficient multi-functional catalysts", Chemical Science, vol. 11, 2020, pp. 786-790.
Chen et al., "Towards covalent organic frameworks with predesignable and aligned open docking sites", Chem. Commun., vol. 50 No. 46, 2014, pp. 6161-6163.
Office Action received for Chinese Patent Application No. 202280051297.7, mailed on Jun. 9, 2026, 14 pages (5 pages of English Translation and 9 pages of Original Office Action).

* cited by examiner

METAL-DOPED COVALENT ORGANIC FRAMEWORKS

CROSS-REFERENCE TO RELATED APPLICATIONS

This application is the National Stage of International Application No. PCT/US22/32225, filed Jun. 3, 2022, which application claims benefit of and priority to U.S. Provisional Application No. 63/228,890, filed Aug. 3, 2021 the entirety of both applications are hereby incorporated by reference.

FIELD OF THE INVENTION

Covalent organic framework compositions doped with metals are provided that have enhanced sorption properties.

BACKGROUND OF THE INVENTION

The ability to selectively remove components from a fluid flow is valuable for a wide variety of applications. Some examples of applications for selective removal of components from fluid flows can correspond to gas purification, such as removal of $H_2S$ from an $H_2$-containing stream to increase the $H_2$ content. Other examples can correspond to removal of a component to allow for subsequent processing, such as removing $CO_2$ from a fluid flow to allow for sequestration of the $CO_2$. A common strategy for selective removal of components from a fluid flow is to expose the fluid flow to a sorbent material under appropriate conditions.

Covalent organic frameworks (COFs) are a relatively new class of materials. COFs can often have high accessible surface areas and relatively large pore volumes. This makes COFs a potentially attractive material for use in various applications where high surface areas and/or pore volumes are beneficial.

Some COFs have been used for sorption of components mixtures. For example, U.S. Patent Application Publication 2021/0086164 describes amide-linked covalent organic frameworks that can be used for selective sorption of gold from an aqueous mixture.

Other COFs have been used for catalytic applications. For example, U.S. Pat. No. 10,301,727 describes using covalent organic framework materials as a support for metal nanoparticles composed of non-noble metals. The covalent organic framework supported (noble metal free) metal nanoparticle compositions are described as electro catalysts for water splitting.

Another type of COF for catalytic applications is described in an article by S. Lin et al. titled "Covalent Organic Frameworks Comprising Cobalt Porphyrins for Catalytic $CO_2$ Reduction in Water (Science, Vol. 349, pages 1208-1213, (2015)). Covalent organic framework materials are described that are assembled from cobalt porphyrin compounds, where the cobalt is retained after formation of the covalent organic framework.

Still another type of catalyst is described in an article by S. Y. Ding titled "Construction of Covalent Organic Framework for Catalysis: Pd/COF-LZU1 in Suzuki-Miyaura Coupling Reaction" (J. Am. Chem. Soc., Vol. 133, pages 19816-19822 (2011)). The reference describes addition of palladium to the covalent organic framework material COF-LZU1.

U.S. Pat. No. 8,088,356 describes covalent organic framework materials that are doped with alkali metal ions or alkaline earth metal ions for use in hydrogen storage.

U.S. Pat. No. 10,301,727 describes covalent organic frameworks as supports for non-noble metal-based water splitting electrocatalysts. Two specific types of covalent organic framework materials are described as supports for metal nanoparticles that can be used as catalysts for electrolysis of water.

Some investigation of COF materials for sorption of $CO_2$ has also been performed. It would be desirable to have systems, methods, and/or compositions of matter that can improve and/or modify the nature of $CO_2$ sorption by COF materials.

SUMMARY OF THE INVENTION

In an aspect, a composition is provided. The composition includes a covalent organic framework including one or more functional groups. The one or more functional groups can correspond to imine, amine, pyridine, imidazole, furan, ketone, aldehyde, ether, ester, or a combination thereof. Additionally, the composition can include one or more metal ions and at least one counterion having a stoichiometry within the composition of $MX_Y$. For this stoichiometry within the composition, M is the one or more metal ions, X is the at least one counterion, and Y is a) between 2.9 and 3.1, b) between 1.9 and 2.1, c) between 3.9 and 4.1, or d) between 0.9 and 1.1. The one or more metal ions can correspond to metal ions of Mg, Ca, Y, La, Al, Ga, In, Co, Cr, Fe, Ti, Zr, Sc, V, Mn, Ni, Cu, Zn, or a combination thereof. The composition can further include i) a molar ratio of the one or more metal ions to nitrogen of 0.005 to 0.5, ii) 1.0 wt % to 15 wt % of the one or more metal ions relative to a weight of the composition, or iii) a combination of i) and ii).

In some aspects, the one or more functional groups can correspond to one or more imine functional groups. In some aspects, the one or more metal ions can correspond to metal ions of Mg, Ca, Y, La, Al, Ga, In, Co, Cr, Fe, Ti, Zr, Sc, V, Mn, or a combination thereof. In some aspects, the one or more metal ions can correspond to metal ions of Mg, Ca, Y, La, Al, Ga, In, Co, Cr, Fe, Ti, Zr, or a combination thereof. In some aspects, Y can be between 2.9 and 3.1 and the one or more metal ions can correspond to metal ions of Al, Ga, In, Co, Cr, Fe, or a combination thereof.

In another aspect, a composition is provided. The composition can include a covalent organic framework comprising imine functional groups. The composition can further include one or more metal ions and at least one counterion having a stoichiometry within the composition of $MX_Y$, where M is the one or more metal ions, X is the at least one counterion, and Y is between 2.9 and 3.1. The composition can further include i) a molar ratio of the one or more metal ions to nitrogen of 0.005 to 0.5, ii) 1.0 wt % to 15 wt % of the one or more metal ions relative to a weight of the composition, or iii) a combination of i) and ii). Additionally, the composition can include $CO_2$, a molar ratio of $CO_2$ to the one or more metal ions being between 0.01 and 1.0 in the composition. The composition can further include a peak in an FTIR spectrum between 1635 $cm^{-1}$ and 1660 $cm^{-1}$, and a peak in the FTIR spectrum between 1615 $cm^{-1}$ and 1625 $cm^{-1}$.

DETAILED DESCRIPTION OF THE INVENTION

Figure 1:
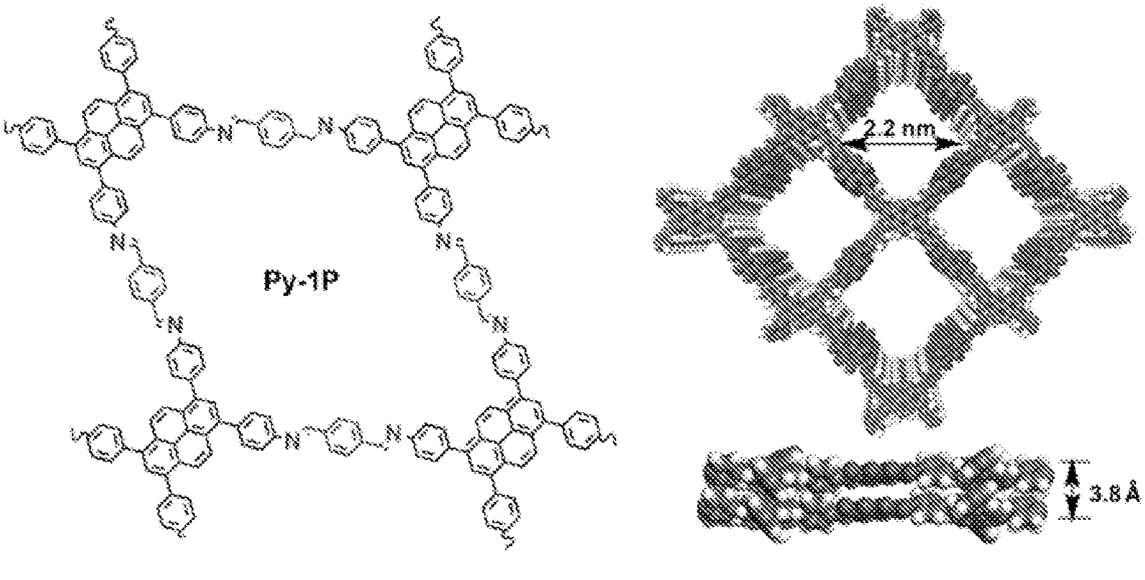
FIG. 1 shows an illustration of the chemical structure of Py-1P along with illustrations of a layered crystalline structure.

All numerical values within the detailed description and the claims herein are modified by "about" or "approximately" the indicated value, and take into account experimental error and variations that would be expected by a person having ordinary skill in the art.

Overview

In various aspects, compositions are provided corresponding to covalent organic framework materials that are doped with selected metal ions. The selected metal ions can correspond to metal ions that can both a) form a bonding complex with imine groups (or other functional groups) in the COF material, and b) after forming the bonding complex with the imine group (or other functional group), can further form a modified sorption complex with the imine group/functional group and a sorbed component, such as a $CO_2$. As a result, the metal ion-doped organic framework materials can have unexpected sorption properties for sorption of components such as $CO_2$. The metal ions can be selected in part based on "hard soft acid base" (HSAB) theory, as explained in greater detail herein. Methods of sorption of components from gas phase flows are also provided.

Covalent organic frameworks (COFs) correspond to organic polymeric materials that are typically formed by bonding together a plurality of smaller poly-functional organic compounds, or secondary building units, having reactive groups with suitable geometric orientation to form ordered framework structures with defined porosity. A covalent organic framework can exist as a two-dimensional layered structure or a three-dimensional structure. COFs are sometimes referred to as crystalline materials; however, for some types of COFs, it is possible to assemble the secondary units in a manner that results in a reduced or minimized crystallinity. For example, for some types of COFs that correspond to dual layer structures, it may be possible to assemble the COF in a manner so that the layers are not aligned and/or aligned in a manner that reduces or minimizes crystallinity.

In a COF material, the bonding of the secondary building units is often facilitated by the presence of heteroatoms different from carbon and hydrogen within the secondary building units. As an example, some types of COFs can form by condensation reactions where a di-aldehyde compound links or bonds together other secondary building units that include amines. This results in formation of imine bonds at the locations where the remaining portion of the di-aldehyde molecule connects to the other secondary building units. More generally, various types of covalent organic framework materials can include imine functional groups as part of the COF. Such imine groups can be part of the framework structure of the COF, pendant groups or side chains attached to the framework structure of the COF, and/or any other location in the COF. Still more generally, COFs can be formed that include various types of functional groups that form part of the framework structure of the COF and/or that correspond to side chains attached to the framework structure of the COF.

It has been discovered that COFs that include imine functional groups can be doped with metal ions so that the metal ions have a bonding interaction (such as formation of a dative bond complex) with at least a portion of the imine functional groups. Such a bonding interaction can be identified, for example, based on the change in the imine adsorption peak in an infrared adsorption spectrum. Without being bound by any particular theory, when suitable metal ions are used as the dopant metal ions, these dative bond complexes are believed to provide sites in a metal ion-doped covalent organic framework material where "enhanced" sorption of $CO_2$ can be performed by the material. Without being bound by any particular theory, it is believed that this enhanced sorption is due to formation of a modified sorption complex. This is in contrast to traditional sorption of $CO_2$ by COF materials, where the sorption primarily corresponds to conventional physisorption. The suitable metal ions can correspond in part to "hard acid" ions under "hard soft acid base" (HSAB) theory.

In some aspects, it has been unexpectedly discovered that addition of suitable metal ion-dopants can modify the sorption properties of a COF material for a component such as $CO_2$. In particular, the sorption isotherms or isobars of the resulting material can exhibit "step-like" behavior, so that for at least one combination of temperature and pressure, a sharp increase in sorption can be observed. In such aspects, the amount of sorption increase and/or the location(s) of the sorption increase in the adsorption isotherm/isobar can be varied based on the nature of the metal ion-dopant. The presence of such "step-like" behavior in a sorption isotherm/ isobar can be valuable when attempting to use a material for selective sorption of component (such as $CO_2$) from a fluid stream (such as a gas phase stream). It is noted that at least some metal ion-dopants can also provide a plurality of such temperature and pressure combinations that provide "step-like" behavior. This can provide another potential advantage for sorption applications, as this can provide multiple options for selecting a temperature and pressure range for performing sorption of a component from a fluid stream.

Additionally or alternately, it has been unexpectedly discovered that addition of metal ion-dopants can increase the sorption capacity of covalent organic materials. In some aspects, this unexpected increase in sorption capacity can be achieved even though the addition of the metal ion-dopants results in a decrease in the available surface area of the COF.

Still another potential advantage of using metal ion-dopants to enhance the sorption properties of covalent organic frameworks is the ability to tailor the sorption properties of the resulting material by using a combination of metal dopants. For example, combinations of metal dopants that provide different sorption behavior can be added. This could allow for creation of a sorbent material that can function as a sorbent under a plurality of different operating conditions. This can allow the conditions for a sorption process to be varied while still using the same sorbent material.

Further additionally or alternately, still other advantages of metal ion-doped COF materials can be related to the ability to modify the metal ion-doping. Due to the nature of how the dopant metals are incorporated into the COF, the dopant metals can also be removed while still preserving the framework structure of a covalent organic framework. This ability to remove dopant metals can provide a variety of advantages. First, this can allow for recovery of metals when it is desired to recycle a sorbent based on a COF material. Additionally or alternately, the dopant metals in a COF materials could be replaced one or more times with alternative metals (including alternative combinations of metals) to allow for tailoring of a sorbent to different types of sorption processes.

In yet other aspects, another potential benefit can be the ability to modify the sorption properties of a metal ion-doped COF material based on controlling the amount of hydration in the material. Without being bound by any particular theory, it is believed that waters of hydration associated with the location of the imine-metal bonding interaction can play a role in modifying an activation energy barrier for forming a modified sorption complex for components such as $CO_2$. For example, the waters of hydration at the metal cation sites may weaken the interaction between the metal ion dopants and nitrogen atoms in the COF. This can increase the favorability for insertion of $CO_2$ into the metal ion dopant/nitrogen atom interaction. Conversely, by limiting the degree of metal hydration by, for example, heating, the metal ion dopant/nitrogen atom interaction is strengthened thereby requiring a higher partial pressure of $CO_2$ to enable its insertion into the metal-imine dative bond. Thus, by controlling the level of hydration at the imine-metal dative bond complex sites, the sorption properties of a material can be modified. In some aspects, control over the level of hydration can be based at least in part on the temperature selected during a pre-treatment drying step that is performed prior to performing sorption. Additionally or alternately, in some aspects, control over the level of hydration can be based at least in part on the level of humidity that a material is exposed to prior to or during a sorption process.

Finally, in some aspects, covalent organic frameworks with functional groups other than imines can be used. In such aspects, the covalent organic framework can include one or more functional groups that can act as electron donors in order to form a) a bonding interaction between the functional group and a metal ion dopant, and b) subsequently form a modified sorption complex involving the functional group, the metal ion dopant, and $CO_2$ (and/or another potential component for sorption). Examples of such functional groups can include imines, amines, pyridines, imidazoles, furans, ketones, aldehydes, ethers, esters, and combinations thereof. In some aspects, a COF material can include one or more functional groups selected from imines, pyridines, imidazoles, ketones, aldehydes, esters, and ethers. In some aspects, a COF material can include one or more functional groups selected from imines, pyridines, and imidazoles. In some optional aspects, a COF material can include one or more functional groups selected from imines, pyridines, imidazoles, and amines.

In some aspects, a COF can include a sulfur-containing functional group in addition to an imine, amine, pyridine, imidazole, furan, ketone, aldehyde, ether, and/or ester. In such aspects, a COF can further include a functional group corresponding to sulfide, thieno, or thienyl. Optionally, such a sulfur-containing functional group can form part of the framework structure.

Definitions

In this discussion, a covalent organic framework (COF) is defined as a two-dimensional or three-dimensional polymeric structure composed of one or more secondary building units, each of which contains two or more moieties arranged geometrically on the building unit capable of forming covalent linkages with the same or alternate moieties on other building units, and thereby assembles into an extended framework having linkages between building units in a geometry determined by the geometric arrangement of the reactive moieties of the secondary building units. In this discussion, at least a portion of the secondary building units for forming the framework structure correspond to secondary building units that contain at least one organic ring structure (i.e., cyclic structure), the at least one organic ring structure being composed of 5 to 10 atoms that form a cyclic structure. The at least one organic ring structure can be aliphatic or aromatic. The at least one organic ring structure can optionally include one or more atoms different from carbon (e.g., N, O) that are part of the cyclic structure. The at least one organic ring structure can also include one or more side chains and/or hydrogens bonded to the cyclic structure. In this discussion, the secondary building units are bonded together in a way so that the at least one organic ring structure forms a part of the framework structure of the covalent organic framework. It is noted that the secondary building units can optionally contain one or more other organic ring structures that do not form part of the framework structure of the covalent organic framework. Additionally, in this discussion, the secondary building units used to form the framework structure of the covalent organic framework define one or more framework ring structures. In other words, the covalent bonding of the secondary building units results in formation of a framework that corresponds to a cyclic structure. It is noted that the framework ring structure(s) provide an inherent molecular void space defined by the regular and continuous geometric wall structure of the framework ring structure. When a crystalline COF is formed, the assembly of COF units into a higher order structure can allow such inherent void spaces to be stacked together to form pores and/or channels. FIG. 1, described in more detail below, shows an example of such framework ring structures.

In this discussion, a framework ring structure of a covalent organic framework material is defined to include any atoms that can form part of a continuous cyclic path that passes through organic ring structures of a plurality of secondary building units. A continuous cyclic path is defined as a path that starts and finishes with the same atom. When forming such a continuous path, each atom can be used only once in forming a given continuous path. However, it may be possible to draw multiple continuous paths that include a given atom. It is noted that such a continuous cyclic path can be started at any convenient atom that resides within a path. As an example, methyl side chains cannot be part of a continuous path, as any effort to include the methyl side chain as part of the path would require passing twice through the atom where the methyl side chain is bonded.

In this discussion, a functional group is defined as one or more atoms bonded in the manner that is necessary to form the functional group. Thus, in this discussion, an imine corresponds to a carbon atom and a nitrogen atom that are bonded by a covalent double bond interaction. An amine corresponds to a nitrogen atom that has at least three covalent bonds, with at least one covalent bond corresponding to a bond with a carbon atom, and at least two of the covalent bonds corresponding to bonds with either a carbon atom or a hydrogen atom. A pyridine corresponds to a nitrogen bonded to two carbons in a cyclic 6-membered aromatic ring structure. An imidazole corresponds to a 5-membered aromatic ring that includes two non-adjacent nitrogen atoms. A furan corresponds to a 5-membered aromatic ring that includes one oxygen atom. A ketone corresponds to a carbonyl group (carbon double-bonded to oxygen), where the carbon atom is also covalently bonded to two other carbon atoms. An aldehyde corresponds to a carbonyl group, where the carbon atom is also covalently bonded to one carbon atom and one hydrogen atom. An ether corresponds to an oxygen atom that is covalently bonded to two carbon atoms. An ester corresponds to a carbon atom that forms a carbonyl group with one oxygen atom, a covalent single bond with a second oxygen atom, and a covalent single bond with a carbon atom.

It is noted that the various functional groups defined above can potentially form part of a larger functional group. For example, a guanidine functional group contains an imine functional group. Thus, a COF material that includes a guanidine functional group by definition includes an imine functional group. Similarly, the presence of an amidine functional group in a COF material by definition means that both an imine and an amine are present.

In this discussion, the presence of a functional group within a COF material can be determined based on the formal IUPAC name for the material.

In this discussion, an imine functional group is considered to be part of the framework structure of a covalent organic framework when at least one continuous cyclic path can be drawn that includes both the carbon and the nitrogen atom of the imine functional group. In some aspects, a COF material can include one or more imine functional groups that are part of the framework structure of the COF. In some aspects, a COF material can include one or more imine functional groups that correspond to pendant groups (i.e., side chains) from the framework structure of the COF. In some aspects, a COF material can include one or more imine groups that are part of the framework structure and one or more imine groups that are pendant groups. An imine group can also be partially pendant, wherein the carbon atom of the imine functional group is part of at least one continuous cyclic path, but the nitrogen atom is not. Optionally, one or more of the imine functional groups can correspond to imine functional groups created by an imine condensation reaction that is performed as part of forming the COF material. Optionally, one or more of the imine functional groups can correspond to imine functional groups that are present in the secondary building units used to form the COF. More generally, a functional group can be considered to at least partially a part of the framework structure of a covalent organic framework structure if at least one atom from the functional group forms part of the framework structure. A functional group in a covalent organic framework that contains no atoms that are part of the framework structure can correspond to a pendant functional group.

In this discussion, references to the periodic table, including references to Groups from the periodic table, are defined as references to the current version of the IUPAC Periodic Table.

In this discussion, "vppm" refers to volume parts per million, while "wppm" refers to weight parts per million.

Synthesis and Characterization of Metal Ion-doped Covalent Organic Framework Materials In various aspects, a covalent organic framework (COF) material that includes imine functional groups (and/or optionally other electron donor functional groups that include a lone pair) can be doped with metal ions in order to modify the sorption properties of the material. The metal ion-dopants can be added to the COF material by any convenient method.

In some aspects, the imine functional group (and/or other functional group) can correspond to an imine in a location that is not part of the framework structure of the COF material. In other aspects, the imine functional group can correspond to an imine functional group that is part of the framework structure of the COF material. Various COF materials include one or more imine functional groups as part of the framework structure of the COF. An example of a COF including imine functional groups as part of the framework structure is Py-1P, or 1,3,6,8-tetrakis(4-aminophenyl)pyrene-terephthalaldehyde. Other examples of COFs including imine functional groups as part of the framework structure are Py-TT, or (4,4',4",4'"-(pyrene-1,3,6,8-tetrayl)tetraaniline)-(thieno[3,2-b]thiophene-2,5-dicarbaldehyde); and Py-Py, or (4,4',4",4'"-(pyrene-1,3,6,8-tetrayl)tetraaniline)-(4,4',4",4'"-(pyrene-1,3,6,8-tetrayl)tetrabenz-aldehyde). Still other examples of COF structures including imine functional groups include, but are not limited to, COF-300, TpOMe-DAQ, and LZU-301. Still other examples of COF materials that contain imine functional groups include, but are not limited to, COF-320, NUS-2, ACOF-1, LZU-1, TAPB-PDA, TAPB-OMePDA, Tp-ODH, and TpPA-1. It is noted that some of these latter examples of COF materials may include imines that are conjugated with other functionalities. Yet still other examples of COF materials can include COF-505, TpBD, ILCOF-1, and the HO—$H_2$P—COF series.

One method for forming a COF material that contains imine functional groups is by imine condensation, where amine-containing secondary building units are reacted with di-aldehydes (and/or other multi-aldehyde compounds) to form a covalent organic framework. As an example, Py-1P can be formed by imine condensation using the reactants 1,3,6,8-tetrakis(4-aminophenyl)pyrene and terephthalaldehyde. In this type of synthesis, the imine functional groups are formed by the reaction of an aldehyde with an amine. In other aspects, any convenient method for introducing an imine functional group into a COF material can be used. For example, a diketone and/or multi-ketone compound could be used in place of an aldehyde. Similarly, hydrazine hydrate could be used instead of an amine. More generally, any convenient reaction that forms an imine could be suitable, so long as a COF material is formed.

After obtaining a COF material, the COF can be doped with metal ions. The metal ions can be selected from metal ions that can have a bonding interaction with at least a portion of the imine functional groups in the COF material.

Without being bound by any particular theory, it is believed that the presence of the bonding interaction between a metal ion dopant and an imine functional group can be observed using Fourier-transform infrared (FTIR) spectroscopy. Generally, it is believed that an imine stretch peak in an FTIR spectrum of a COF material can be located between 1610 $cm^{-1}$ and 1690 $cm^{-1}$, or 1610 $cm^{-1}$ to 1650 $cm^{-1}$, or 1615 $cm^{-1}$ to 1635 $cm^{-1}$. After addition of metal ion dopant(s), this imine stretch can be shifted to larger wavenumbers by 5.0 $cm^{-1}$ to 50 $cm^{-1}$. Based on an initial range of 1610 $cm^{-1}$ to 1690 $cm^{-1}$ and a potential shift of 5.0 $cm^{-1}$ to 50 $cm^{-1}$, this could result in a shifted imine stretch (after addition of metal ion dopant) between 1615 $cm^{-1}$ and 1740 $cm^{-1}$, or optionally between 1635 $cm^{-1}$ and 1660 $cm^{-1}$. Without being bound by any particular theory, it is believed that this change is due to the interaction between $Fe^{3+}$ and the imine bond, indicating that the $Fe^{3+}$-doping happens at the N site. In this discussion, FTIR was performed with a Bio-Rad FTS-3500 ARX FTIR spectrometer, and FTIR spectra were measured based on attenuated total reflection mechanism.

Without being bound by any particular theory, based on the shift in the imine stretch observed in an FTIR spectrum, it is believed that the bonding interaction between the metal ion dopant and the imine corresponds to a bonding complex (such as a dative bonding interaction). It is believed that this bonding complex can provide a location for formation of a modified sorption complex for sorption of a component (such as $CO_2$) from a fluid stream.

In some aspects, the metal ions suitable for having a bonding interaction with imine functional groups in a COF material can be qualitatively based on hard-soft acid-base (HSAB) theory whereby hard atoms (more electronegative, less polarizable electron density) are attracted to other hard atoms, and soft atoms (more electropositive, more polarizable) are attracted to other soft atoms. Without being bound by any particular theory, it is believed that the hard metals under HSAB theory can provide suitable metal ions for both a) forming a bonding interaction with an imine group and b) subsequently forming a modified sorption interaction with the imine group and a $CO_2$. Generally, metals with increased oxidation state can have higher hardness. Generally, metals in row 4 of the periodic table can have increased hardness. Generally, metals in columns 3 to 6 of the periodic table can have increased hardness. It is also noted that Group 13 metals ($Al^{3+}$, $Ga^{3+}$, $In^{3+}$) correspond to hard metals. Without being bound by any particular theory, it is believed that hard metal ions to the left of the transition series of the periodic table can have a higher tendency to be suitable for use in forming a bonding complex with an imine as well as a subsequent sorption complex with an imine and a $CO_2$.

In some aspects, suitable metal ions can correspond to a portion of the metal ions that correspond to "hard metals" under HSAB theory. In such aspects, a metal ion dopant can correspond to: $Al^{3+}$, $Ga^{3+}$, $In^{3+}$, $Co^{3+}$, $Cr^{3+}$, $Fe^{3+}$, or a combination thereof. In other aspects, an expanded list of metal ion dopants can include $Mg^{2+}$, $Ca^{2+}$, $La^{3+}$, $Al^{3+}$, $Ga^{3+}$, $In^{3+}$, $Co^{3+}$, $Cr^{3+}$, $Fe^{3+}$, or a combination thereof. In other aspects, a further expanded list of metal ion dopants can include $Mg^{2+}$, $Ca^{2+}$, $Y^{3+}$, $La^{3+}$, $Al^{3+}$, $Ga^{3+}$, $In^{3+}$, $Co^{3+}$, $Cr^{3+}$, $Fe^{3+}$, $Ti^{4+}$, $Zr^{4+}$, $Sc^{3+}$, $Mn^{3+}$, $V^{3+}$, or a combination thereof. In yet other aspects, a still further expanded list of metal ion dopants can include some +2 oxidation state metals that are of an "intermediate" hardness value under HSAB theory. In such aspects, the metal ions corresponding to $Fe^{2+}$, $Co^{2+}$, $Ni^{2+}$, $Cu^{2+}$, and $Zn^{2+}$, can also be included. It is further noted that under HSAB theory, the alkali metals ($Na^{+}$, $K^{+}$) could also be included, but it is not clear if such metals could subsequently release $CO_2$ after sorption in a manner that would result in a useful commercial sorbent. In such aspects, metals that are "soft" and therefore not suitable as metal ion dopants include ions of the noble metals (Au, Ag, Pd, Pt), as well as ions of Cd, Hg, Tl, and Cu. Additionally, row 4 or 5 metals (or still lower row metals) not otherwise identified here generally correspond to metals that are not suitable.

Metal ion dopants can be added to an already formed COF by any convenient method. For example, an already synthesized COF material can be stirred together with a suitable metal salt in a solution, such as an alcohol solution, to add metal ion dopants to the COF. Examples of counter-ions for the metal salts can include any counter-ions that do not otherwise interfere with the functional groups present in the COF. Additionally or alternately, the counter-ions can be selected so that the strength of interaction between the metal ion and the counter-ion is weaker than the interaction between the metal ion and the imine (and/or other functional group). Examples of suitable counter-ions can include, but are not limited to, chlorides, bromides, nitrates, nitrites, phosphates, and perchlorates. In aspects where a metal ion-doped COF material is desired for use as a $CO_2$ sorbent, counter-ions such as acetate, carbonate, sulfite, sulfate, and/or hydroxide can be excluded, in order to avoid potential interference with availability of the enhanced sorption interaction. For example, in some aspects, the counter-ion can be any convenient counter-ion different from hydroxide (i.e., excluding hydroxide), or any convenient counter-ion different from acetate, or any convenient counter-ion different from hydroxide or acetate.

It is noted that the interaction between the counter-ion and the metal ion dopants may alter the interaction between the metal center and the nitrogen atoms in the COF structure. Without being bound by any particular theory, it is believed that counter-ions with stronger affinities for metal ion dopants are more tightly bound to the metal ion dopants. This tighter bonding reduces the ability for the metal ion dopant to interact with something other than the counter-ion, such as nitrogen atom(s) in the COF. It is believed that weakening the interaction between metal ion dopants and nitrogen atoms in the COF can favor $CO_2$ insertion into the metal ion dopant/nitrogen atom interaction. The more favorable insertion environment can be seen, for example, in changes in the sorption pressure(s) for $CO_2$ when the metal ion dopant remains the same but the counter-ion is changed. As the affinity of the counter-ion for the metal ion dopant increases, the pressure(s) for $CO_2$ sorption can be reduced.

Because the metal ion dopants are added as metal ions to the COF material, addition of the metal ion dopants also results in addition of the corresponding counter-ions to the COF material. Based on charge balance considerations, the stoichiometry for the metal ion(s) and the counter-ion(s) in the COF material can substantially be $MX_Y$, where M is the metal ion (or metal ions), X is the counter-ion (or counter-ions), and Y is the expected number of the counter-ions in order to provide charge balance based on the oxidation state of the metal ion. It is noted that in order to account for possible variations and/or defects in the COF material structure, Y can have a range of −0.1 to +0.1 around the expected stoichiometric value, to account for things such as structural variations and/or defects. For example, if metal ions are introduced into a COF in the form of a $FeCl_3$, the resulting stoichiometry of metal ion and counter-ion in the COF material can be $MX_Y$ where Y is between 2.9 and 3.1. More generally, depending on the nature of the metal ion and the counter ion, possible ranges for the value of Y can include 2.9 to 3.1 (for +3 metal ions), 1.9 to 2.1 (for +2 metal ions), 3.9 to 4.1 (for +4 metal ions), and/or 0.9 to 1.1 (for either +1 metal ions, or for +2 metal ions that have a counter-ion such as $CO_3^{2-}$), It is noted that when M corresponds to Fe or Co, the value of Y can be between 2.9 and 3.1. In some optional aspects, the one or more metal ions can further include some +2 valence first row metals that are of only intermediate "hardness" under hard-soft acid-base theory. In such optional aspects, the one or more metal ions can correspond to metal ions of Mg, Ca, Y, La, Al, Ga, In, Co, Cr, Fe, Ti, Zr, Sc, V, Mn, Ni, Cu, Zn, or a combination thereof. In such optional aspects, when M is Ni, Cu, Fe, Co, Zn, or a combination thereof in a +2 valence state, the value of Y can be between 1.9 and 2.1.

An alternative way of describing the relationship between the metal ions and counter-ions can be based on the molar ratio. The various values for Y in the $MX_Y$ formula can also be expressed in this manner. In various aspects, the molar ratio of metal ions to counter-ions in the composition can be 0.32 to 0.34, or 0.49 to 0.51, or 0.24 to 0.26, or 0.99 to 1.01.

The amount of metal ion added as a dopant to a COF can be characterized in various manners. In some aspects, the amount of metal ions in a metal ion-doped COF can correspond to 1.0 wt % to 20 wt % of the metal ion-doped COF composition, or 1.0 wt % to 15 wt %, or 1.0 wt % to 10 wt %, or 3.0 wt % to 20 wt %, or 3.0 wt % to 15 wt %, or 3.0 wt % to 10 wt %, or 1.0 wt % to 5.0 wt %. It is noted that these weights for the amount of metal ions do not include the weight of any counter-ions. However, the weight of the counter-ions for the metal ion dopant is also included in the total weight of the composition.

While a characterization based on weight of metal ions versus weight of the COF material can be used, a difficulty with this type of characterization is that metals from the fifth and sixth rows of the periodic table can be substantially heavier than metals from earlier in the periodic table. Thus, another option can be to compare the molar amount of metal ion incorporated in a COF composition with another feature of the COF composition. An example of a convenient comparison can be the molar ratio of metal ion dopants to nitrogens in the COF composition. In some aspects, the molar ratio of metal ion dopants to nitrogens in the COF composition can be 0.005 to 0.50, or 0.01 to 0.15, or 0.01 to 0.10, or 0.05 to 0.20, or 0.05 to 0.15, or 0.05 to 0.10.

In some aspects, in addition to counter-ions, waters of solvation and/or other solvent molecules may be associated with a metal salt used to add metal ion dopants to a COF. Additionally or alternately, solvent molecules may also be associated in some way with the bonding interaction between the metal ion dopant and an imine (and/or other electron donating functional group that includes a lone pair).

In some aspects, a metal ion-doped COF material can be at least partially crystalline in nature. The available surface area for sorption of components by crystalline COF materials can tend to be higher than the surface area of non-crystalline COF materials. In some aspects, the surface area of a metal ion-doped COF material, prior to addition of metal ions as a dopant, can be 300 $cm^2/g$ or more, or 500 $cm^2/g$ or more, or 800 $cm^2/g$ or more, or 1200 $cm^2/g$ or more, or 1500 $cm^2/g$ or more, such as up to 5000 $cm^2/g$ or possibly still higher. In some aspects, after addition of metal ions as dopants, the surface area of a metal ion-doped COF material can be 200 $cm^2/g$ or more, or 300 $cm^2/g$ or more, or 500 $cm^2/g$ or more, or 700 $cm^2/g$ or more, or 1000 $cm^2/g$ or more, such as up to 3000 $cm^2/g$ or possibly still higher. Surface areas can be determined as Brunauer-Emmett-Teller (BET) surface areas. For surface areas in this discussion, $N_2$ sorption measurements were performed on a Micromeritics ASAP 2020 instrument equipped with commercial software for data calculation and analysis. Before each measurement, the sample (50-80 mg) was degassed at different temperatures for 12 hr. The $N_2$ isotherms were collected with a pressure range of 0-0.95 bar.

Additionally or alternately, in some aspects the COF material can have a layered crystalline structure, such as the layered crystalline structure observed for Py-1P. Without being bound by any particular theory, in some aspects where a layered crystalline structure is present, the layered crystalline structure can assist with formation of bonding interactions between the metal ions and the imine functional groups. Without being bound by any particular theory, this could potentially include a metal ion (such as $Fe^{3+}$) having a bridging interaction between two imines in neighboring layers in a layered crystalline structure.

$CO_2$ Sorption Applications

After forming a metal ion-doped COF material, in some aspects the metal-ion doped material can be used as a sorbent for sorption of one or more components from a fluid stream. For example, metal ion-doped COF materials can be used for sorption of $CO_2$ from a gas phase stream. The metal ion-doped compositions described herein, and corresponding novel processes enabled by such compositions, can have potential utility for the design of energy efficient and advantaged processes in applications generally related to selective sorption/removal of components from fluid flows. An example of a selective sorption application is removal of $CO_2$ from a fluid flow. Removal of $CO_2$ from a fluid flow can correspond to various types of processes related to processing of upstream flows, processing of post-combustion flows (including post-combustion in refineries and power plants) and applications such as direct air capture. In other aspects, the compositions can potentially be used for separations involving components other than $CO_2$.

In various aspects, the gas sorption properties of the metal ion-doped COF material can feature stepped sorption and/or desorption features, as defined by one or more unexpected, finite sharp increases (or steps) of gas sorption over narrow partial pressure ranges. In some aspects, the specific pressure range of these step(s) can be controlled by selection of the metal ion or combination of metal ions. Additionally or alternately, the specific pressure range of these step(s) can be controlled by the operating temperature of the sorption process. Further additionally or alternately, the specific pressure range of these step(s) can be controlled by the level(s) of hydration of the metal ions.

The reversible nature of the metal doping process (through simple amine/ethanol washing to regenerate pure COF) can also present novel and advantageous sorbent recycling process options. These can include re-purposing of a single COF batch for subsequent use in another $CO_2$ sorption process requiring different step isotherm and/or different swing adsorption characteristics (temperature swing adsorption and/or pressure swing adsorption).

In some aspects, use of metal salt mixtures for impregnation rather than a single metal can expand the types of tailoring that can be performed for $CO_2$ sorption processes. In combination with the ability to remove and/or replace the metals in a COF, the compositions described herein can offer a platform approach (i.e., usage of one material under multiple application conditions).

A metal ion-doped COF composition can potentially be incorporated into a variety of form factors for subsequent use in various applications. Such form factors can include, but are not limited to, incorporation of a COF composition as part of a membrane structure; incorporation of a COF composition into a hollow fiber sorbent material; incorporation of a COF composition into a solution or other mixture that is suitable for deposition as a thin film on surface(s) of a structured monolith; incorporation of a COF composition into a thin film that is deposited on a high surface area material, such as material with pores, channels, capillaries, and/or other features that provide additional surface area for contact with fluid flows; and/or any other convenient form factor. Depending on the nature of the form factor, metal ion dopant(s) can be added to the COF composition prior to incorporating the COF composition into the form factor, after incorporating the COF composition into the form factor, or a combination thereof.

Examples of specific applications that can potentially benefit from the sorption properties of metal ion-doped COF compositions include, but are not limited to: natural gas processing and natural gas liquefaction, specifically for $CO_2$, $N_2$, and/or $H_2O$ removal from natural gas; separation of different products (e.g. $H_2$, CO, $CO_2$ or $H_2O$) from steam methane reforming and water gas shift processes; and/or light gas separations in refinery and chemical processes, such as $H_2$ purification, or light olefin/paraffin separations.

As an example, natural gas is a common product generated at many petroleum extraction sites. One of the difficulties with processing natural gas is that a variety of additional gases can be present within the natural gas, such as $CO_2$, $N_2$, He and $H_2$. The relative amounts of such additional gases can vary widely depending on the extraction site, making it difficult to have a standard system for improving the purity level of the resulting natural gas. Other potential issues can include the variability of air temperature and/or humidity.

Using a metal ion-doped COF as a sorbent for purification of natural gas can reduce, minimize, and/or mitigate at least a portion of the difficulties associated with natural gas purification. Based on the variety of metal ions that are available as metal ion-dopants, a metal ion-dopant system can potentially be selected that is tailored for the types of gases present at a natural gas extraction site. As the composition changes over time, the reversible nature of the metal ion association can allow the metal ion-dopants to be replaced to match the changing composition. Additionally, the large surface area and/or large, open pore structure of crystalline COFs can reduce or minimize pressure drops associated with the large volumes of natural gas that may require processing at an extraction site. With regard to air temperature, as shown below, metal ion-doped COF materials can exhibit a plurality of sorption steps in the sorption profile. This means that the amount of heating or cooling of air can be reduced or minimized, as the direct air capture sorption process can be tailored around the closest step in the sorption profile. When temperature changes occur (such as due to seasonal variations), one option can be to use a different sorption step can be used as the target for the sorption process. Alternatively, the reversibility of the metal ion association with the COF can be used to remove an existing metal ion-dopant profile and add a different metal ion-dopant system that provides a better match with the ambient air conditions.

More generally, metal ion-doped COF materials can potentially be used as sorbents in a variety of upstream processing and/or post-combustion applications. As another example, metal ion-doped COF materials can be used as a sorbent for processing of flue gases generated by combustion. A variety of processes generate flue gases from combustion. Such processes can range from industrial scale natural gas power plants to individual point sources in a refinery/factory/commercial/residential setting. The ability to change metal, metal hydration level, and/or process temperature to generate different sorption profiles (including different locations for the "steps" in the sorption profile) can allow for tailoring of sorbents based on metal ion-doped COF materials to match the output streams (e.g., flue gases) from a variety of combustion sources. Additionally, if the nature of the flue gas from a combustion source changes, the ability to replace the metals in a COF material can allow for further adaptation of a sorption system when a combustion process undergoes changes over time.

As still another example, a potential application for metal ion-doped COFs can be as sorbents for direct air capture (DAC) of $CO_2$. Performing direct air capture of $CO_2$ can pose a variety of challenges. For example, the $CO_2$ concentration is relatively low (~400 vppm). Due to this relatively low concentration, capture of $CO_2$ directly from air requires exposure of large volumes of air to some type of sorption site.

Using a metal-ion doped COF as the sorbent for direct air capture can reduce, minimize, and/or mitigate these difficulties associated with direct air capture. COF materials can have relatively high surface areas. Additionally, due to the nature of crystalline COF materials, many COF materials have pore structures with relatively large pore openings. This combination of high available surface area and a relatively large, open pore structure can reduce or minimize pressure drop when attempting to pass large volumes of air through a COF material.

EXAMPLES—GENERAL

The following examples illustrate the formation and use of metal ion-doped COFs. In the following examples, the COF material Py-1P is synthesized, and then doped with various metal ions ($Fe^{3+}$, $Cr^{3+}$, $In^{3+}$).

The below examples demonstrate preparation of novel metal ion-doped COF compositions with enhanced $CO_2$ uptake due to a novel sorption mechanism. The novel compositions exhibit temperature- and hydration-sensitive step isotherms that are potentially advantageous for design of a pressure and/or temperature swing $CO_2$ scrubbing process involving upstream, refinery, ambient air, and/or post-combustion applications. Furthermore, metal doping of the material is reversible, leading to advantages for recycling, regenerating, and tailoring a single sorbent batch for multiple cycles or uses.

Example 1A—Synthesis of Metal Ion-Doped Py-1P

First, 1,3,6,8-tetrakis(4-aminophenyl)pyrene was synthesized. To a 50 mL flask, 1,3,6,8-tetrabromopyrene (0.74 g, 1.4 mmol, 1.0 eq.), 4-aminophenylboronic acid pinacol ester (1.5 g, 6.9 mmol, 4.8 eq.), $K_2CO_3$ (1.1 g, 7.9 mmol, 5.5 eq.), and $Pd(PPh_3)_4$ (tetrakis triphenyphosphine palladium, 165 mg, 0.14 mmol, 10 mol %) were added under argon atmosphere. Then, oxygen-free 1,4-dioxane (16 mL) and $H_2O$ (4 mL) were added to the above flask, and the mixture was refluxed (115° C.) for three days under an argon atmosphere. After cooling the reactants to room temperature, an excess amount of $H_2O$ was added. A light yellowish precipitate was obtained and collected via filtration, which was further washed by $H_2O$ and MeOH. The crude product was purified by dissolving in acetone and then filtered and precipitated in water. The precipitates were collected by centrifugation and dried under a vacuum at 373 K. Bright yellow powder was obtained (yield: 82 wt %). Solution-based $^1H$ NMR (400 MHz, DMSO-d6) was performed, and integration of the peaks in the spectra provided the following chemical shifts (δ) for different types of hydrogen in the resulting material: 8.13 (4H), 7.79 (2H), 7.34 (8H), 6.77 (8H), 5.30 (8H). The solution-based nuclear magnetic resonance spectroscopy (NMR) was conducted using 5 mm tubes on a Bruker Avance 400 MHz NMR spectrometer (DRX400) with chemical shifts being quoted in parts-per-million (ppm) relative to tetramethylsilane.

The synthesized 1,3,6,8-tetrakis(4-aminophenyl)pyrene was then used to make the COF 1,3,6,8-tetrakis(4-aminophenyl)pyrene-terephthalaldehyde (Py-1P). To a 10 mL vial, 1,3,6,8-tetrakis(4-aminophenyl)pyrene (14.0 mg, 20 μmol) and terephthalaldehyde (5.4 mg, 40 μmol) were added, then 1,4-dioxane (0.3 mL) and mesitylene (0.7 mL) were added to the solid mixture. After brief sonication, acetic acid (0.1 mL, 6 M) was added to the mixture. The mixture was heated in an oven at 120° C. for seven days. The brown precipitate was collected by centrifugation, washed with THF, immersed in THF and ethanol for three days.

After being dried under a vacuum at room temperature for one day, the final crystalline Py-1P COF was obtained as a yellow powder (78%) having sharp peaks in the powder X-ray diffraction (PXRD) pattern, indicating its high crystallinity. Powder X-ray diffraction (PXRD) patterns were obtained on a Bruker D8 Advance X-ray powder diffractometer equipped with a Cu sealed tube (λ=1.54178 Å) at a scan rate of 2° $min^{-1}$. The measured Brunauer-Emmet-Teller (BET) surface area was 2694 $cm^2/g$ and the pore size was 2.2 nm. $N_2$ sorption measurements were performed on a Micromeritics ASAP 2020 instrument equipped with commercial software for data calculation and analysis. Before each measurement, the sample (50-80 mg) was degassed at different temperatures for 12 h. The $N_2$ isotherms were collected with a pressure range of 0-0.95 bar. FIG. 1 show examples of the molecular structure for Py-1P COF, along with the layered structure for crystalline Py-1P COF.

After forming the Py-1P COF, metal ion-doped versions of Py-1P were formed that included Fe, Cr, and In. To make $Fe^{3+}$-doped Py-1P, $FeCl_3 \cdot 6H_2O$ (1.0 g, 3.7 mmol) was dissolved in ethanol (2 mL), to which high crystallinity 1,3,6,8-tetrakis(4-aminophenyl)pyrene-terephthalaldehyde (Py-1P) COF (50 mg) was added under gentle stirring. The color of the Py-1P COF turned black immediately. The mixture was stirred for another 24 h and then collected by centrifugation and extensively washed with ethanol. Then the black powder (Fe-Py-1P) was dried under a vacuum for three days (yield: 96%). $Cr^{3+}$ and $In^{3+}$-doped Py-1P were prepared similarly using $CrCl_3$ (Cr-Py-1P), and $In(NO_3)_3$ (In-Py-1P).

The $In^{3+}$, $Cr^{3+}$, and $Fe^{3+}$ contents in In-Py-1P, Cr-Py-1P, and Fe-Py-1P were determined by inductively coupled plasma mass spectrometry (ICP-MS). Based on ICP-MS, contents of metals (relative to the total weight of the metal ion-doped Py-1P sample) were determined of 4.38 wt. % ($In^{3+}$), 1.92 wt. % ($Cr^{3+}$), and 2.41 wt. % ($Fe^{3+}$), respectively. As an additional characterization, these weight percentages for the metals can be compared on a molar basis with the number of nitrogen atoms present in the Py-1P. The metal weight percentages correspond to metal ion/N molar ratios of 0.072 ($In^{3+}$/N), 0.069 ($Cr^{3+}$/N), and 0.081 ($Fe^{3+}$/N). All three doped materials exhibited a color change and reduced optical bandgaps. It is noted that for Fe-Py-1P, the XPS spectrum also showed the presence of the chlorine that was used as the counter-ion.

Figure 2:
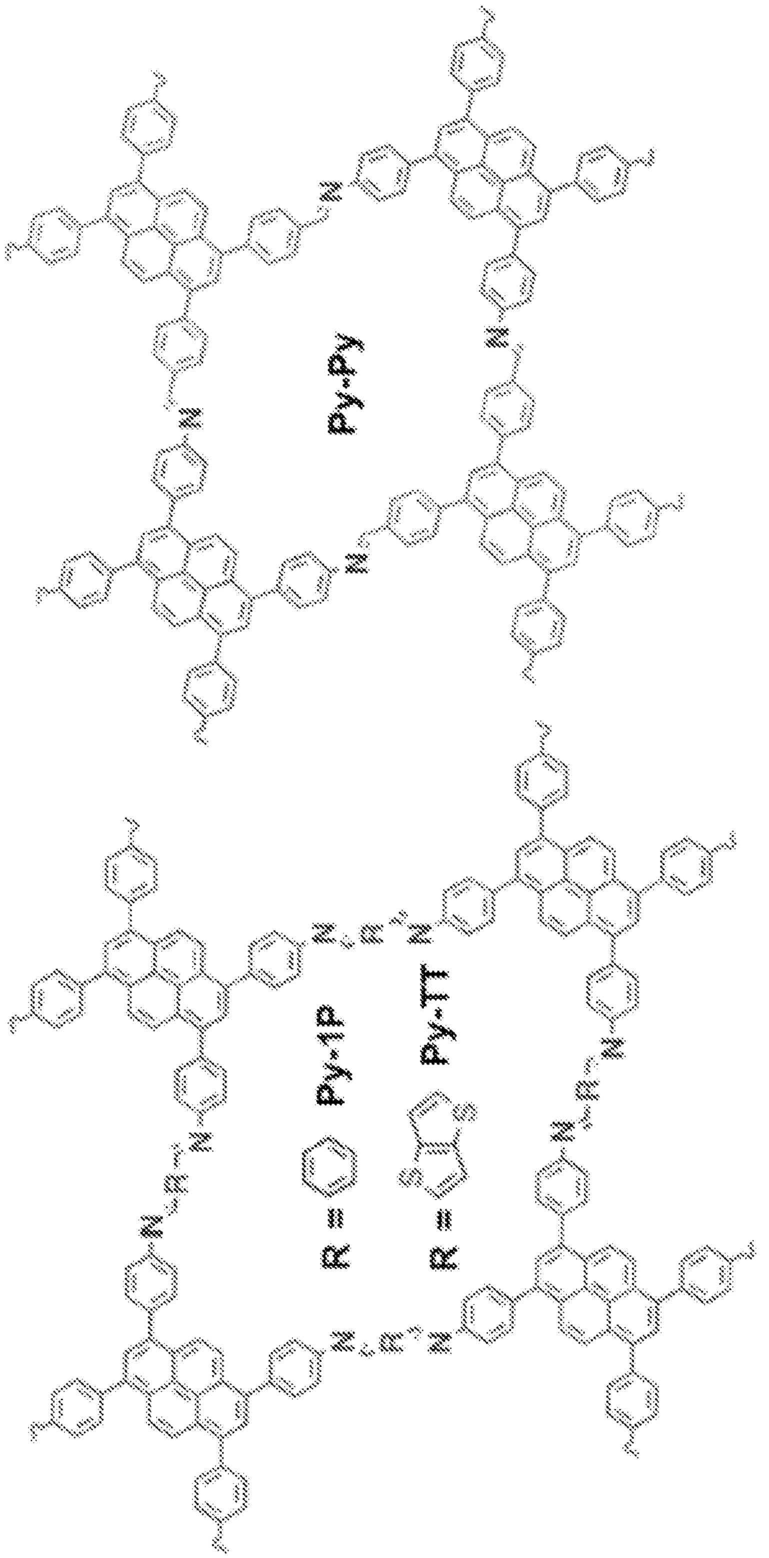
FIG. 2 shows the structure of various COFs.

Example 1B—Synthesis of Py-TT 1,3,6,8-tetrakis(4-aminophenyl)pyrene (28.0 mg, 40 μmol) and thieno[3,2-b]thiophene-2,5-dicarbaldehyde (15.6 mg, 80.0 μmol) were added to a 10 mL vial. Then 1,4-dioxane (0.66 mL) and mesitylene (1.35 mL) were added to the mixture. After brief sonication, 0.2 mL 6 M acetic acid was added to the mixture. The mixture was allowed to react in an oven at 120° C. for three days. The orange precipitate was collected by centrifugation, washed with THF, and then immersed in THF and ethanol for three days. After being dried under a vacuum at room temperature for one day, the final COF was obtained as a yellow powder (yield: 86%). FIG. 2 shows the structure of Py-TT.

Example 1C—Synthesis of Py-Py 1,3,6,8-tetrakis(4-aminophenyl)pyrene (42.0 mg, 74.1 μmol) and 4,4',4'',4'''-(pyrene-1,3,6,8-tetrayl)tetrabenzaldehyde (37.2 mg, 60.1 μmol) were added to a 10 mL vial. Then a mixture of phenylmethanol (2.0 mL) and mesitylene (4.0 mL) was added. After a brief sonication, acetic acid (0.6 mL, 6 M) was added to the mixture. The mixture was heated in an oven at 120° C. for seven days. The light-yellow precipitate was collected by centrifugation, washed with THE, and then immersed in THF and ethanol for three days. After being dried under a vacuum at room temperature for one day, the final COF was obtained as a yellow powder (yield: 93%). FIG. 2 shows the structure of Py-Py.

Example 2A—Further Characterization of Fe-Py-1P

Figure 3:
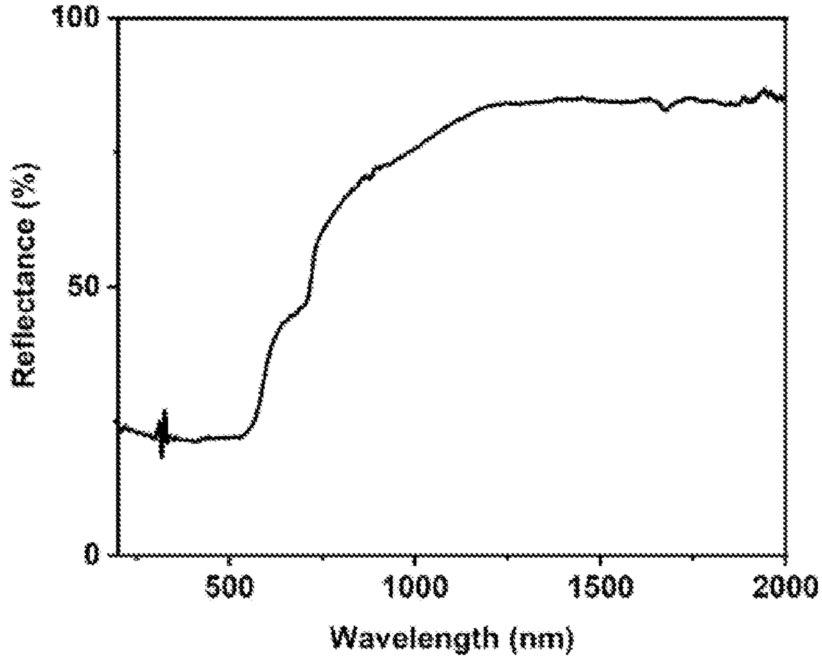
FIG. 3 shows a UV-VIS spectrum for Py-1P.
Figure 4:
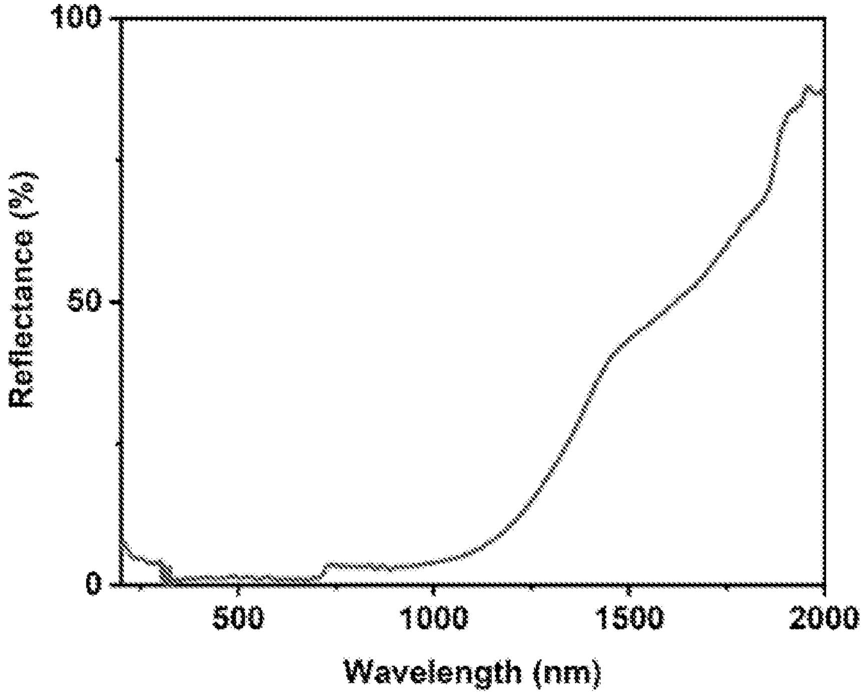
FIG. 4 shows a UV-VIS spectrum for Fe-Py-1P.

Ultraviolet-Visible (UV-VIS) spectroscopy was conducted on the Fe-Py-1P material using a Shimadzu UV-2450 instrument with a scanning wavelength range of 200-2000 nm. FIG. 3 and FIG. 4 show the UV-VIS spectra obtained for the crystalline Py-1P COF before (FIG. 3) and after (FIG. 4) doping with $Fe^{3+}$. The data in FIG. 3 and FIG. 4 was also used to calculate the optical bandgap. Based on the spectra shown in FIG. 3 and FIG. 4, $Fe^{3+}$-doping reduced the optical bandgap of the Py-1P from 2.04 eV to 0.99 eV. A step appeared in the ultraviolet-visible (UV-Vis) spectrum of the Py-1P at around 750 nm, possibly because the 750 nm light excited the fluorescence emission of the Py-1P COF. However, this step disappeared in the UV-Vis spectrum of the Fe-Py-1P, which can be explained by the fluorescence quenching effect of the $Fe^{3+}$. Without being bound by any particular theory, it is believed that metal ion doping facilitates electron jumping between adjacent COF layers, which decreases the Py-1P optical band gap and makes the Fe-Py-1P have a black color. It is noted that similar color changes and changes in bandgap were also observed for the In-Py-1P and Cr-Py-1P materials.

Figure 5:
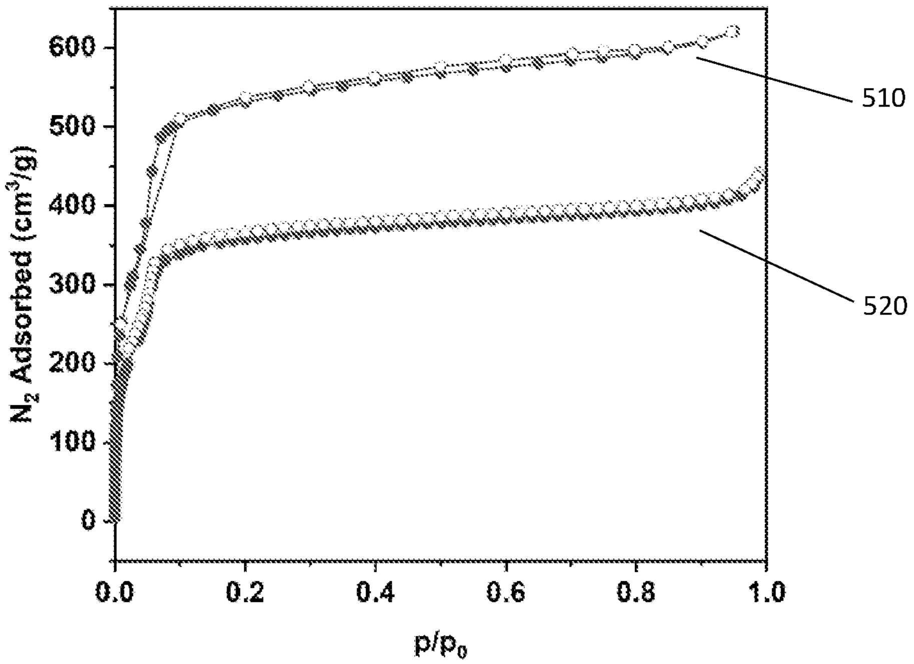
FIG. 5 shows $N_2$ sorption isotherms for Py-1P and Fe-Py-1P.

The BET surface area and pore size for the Fe-Py-1P were also characterized. FIG. 5 shows a comparison of the 77 K $N_2$ sorption isotherms for Py-1P (510) and Fe-Py-1P (520). Based on the sorption isotherms, the surface area of the Py-1P changed upon doping with $Fe^{3+}$ from 2694 to 1230 $cm^2/g$. Pore size was also reduced from 2.2 to 1.9 nm.

Figure 6:
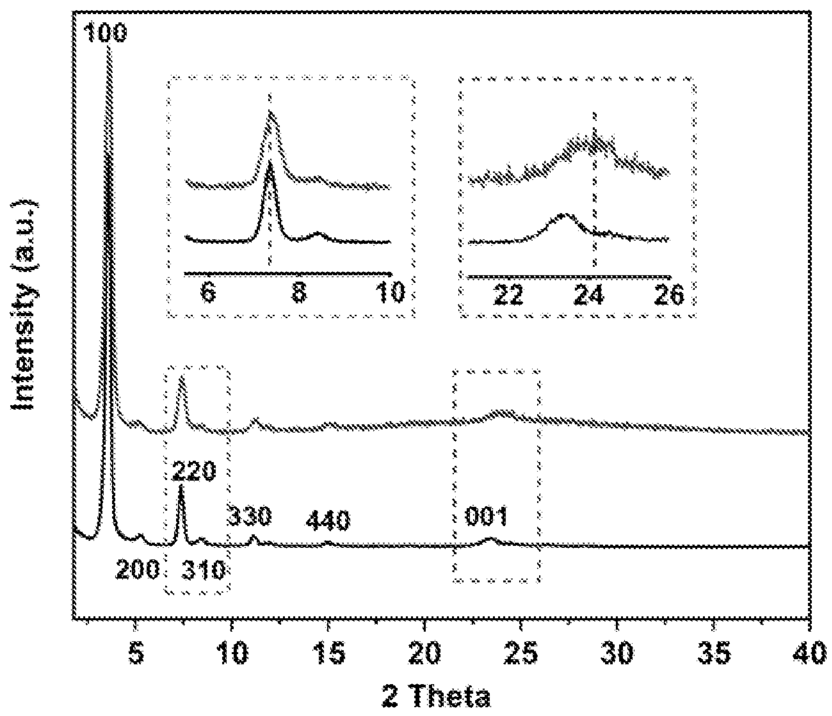
FIG. 6 shows powder X-ray diffraction (PXRD) data for Py-1P and Fe-Py-1P.

FIG. 6 shows the PXRD pattern for Py-1P (bottom) and Fe-Py-1P (top). The insets in FIG. 6 show magnification of the (220) and (001) peaks. As shown in FIG. 6, Fe-Py-1P has a PXRD pattern identical to that of Py-1P, except for the (001) phase. The 2θ values of the (001) phase for Py-1P and Fe-Py-1P are 23.4° and 24.1°, respectively, while the remaining phases have identical 2θ values. This observation implies that the interlayer distance of the Py-1P COF decreases after the $Fe^{3+}$-doping while other Py-1P structural features remain intact.

Figure 7:
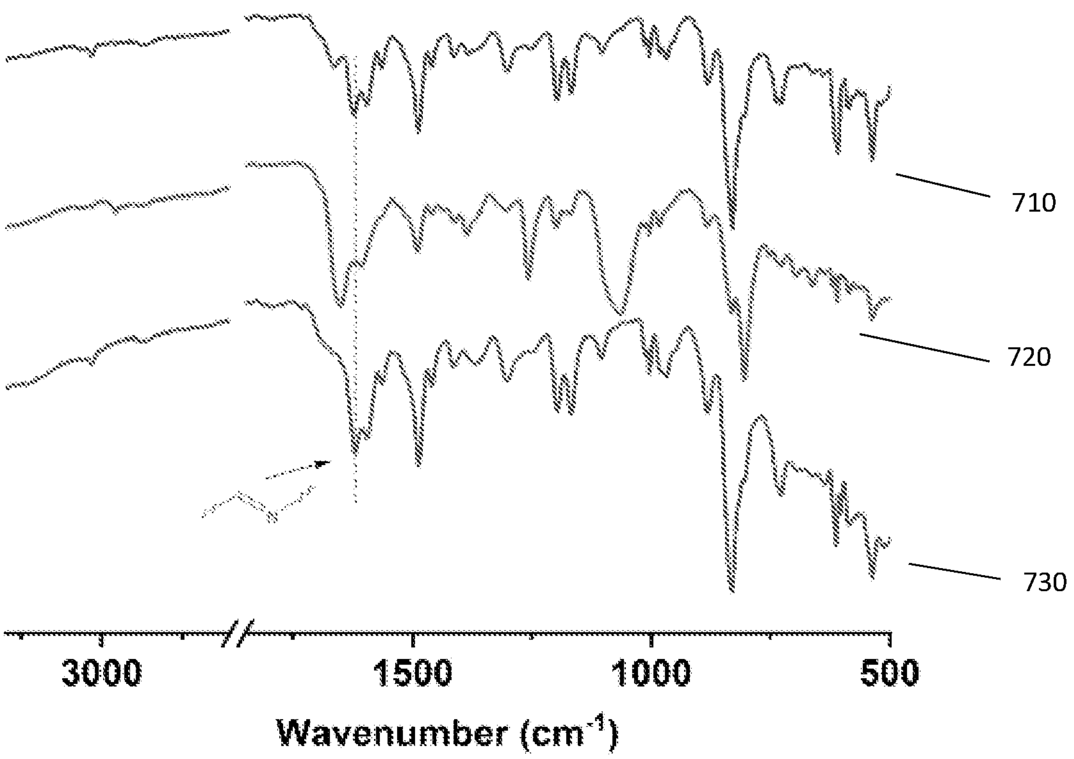
FIG. 7 shows Fourier-transform infrared (FTIR) spectra for various covalent organic framework materials.

FIG. 7 shows results from performing Fourier-transform infrared spectroscopy (FTIR) on various samples. The FTIR was performed with a Bio-Rad FTS-3500 ARX FTIR spectrometer, and FTIR spectra were measured based on attenuated total reflection mechanism. Spectrum 710 corresponds to a Py-1P sample prior to $Fe^{3+}$ doping. Spectrum 720 corresponds to a Py-1P sample after $Fe^{3+}$ doping. As shown in FIG. 7, after $Fe^{3+}$-doping, the imine bond signal moved from 1624.2 to 1651.1 $cm^{-1}$. Without being bound by any particular theory, it is believed that this change is due to the interaction between $Fe^{3+}$ and the imine bond, indicating that the $Fe^{3+}$-doping happens at an N site. A weak undoped imine bond stretch can still be detected after doping suggesting that not all imine bonds interact with $Fe^{3+}$. Spectrum 730 will be discussed in connection with Example 3 below.

Figure 8:
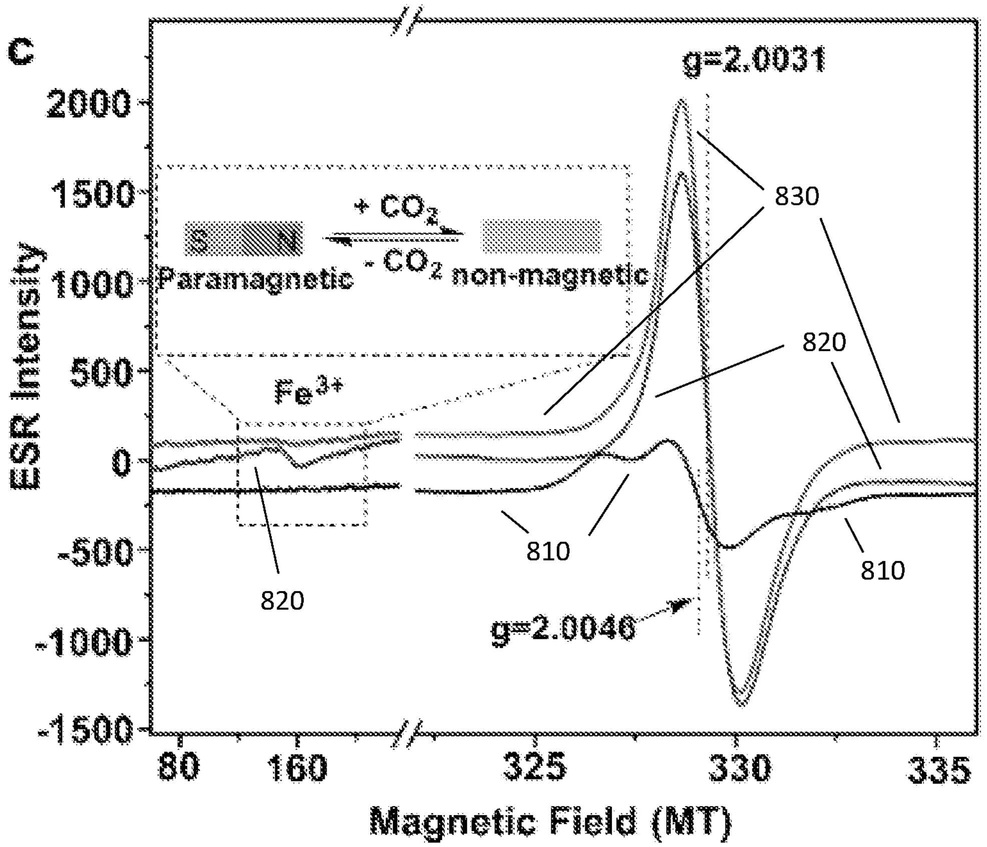
FIG. 8 shows electron spin resonance data for various covalent organic framework materials.

FIG. 8 shows a comparison of the Electron spin resonance (ESR) signal for the undoped Py-1P (810) and $Fe^{3+}$-Py-1P (820). The ESR spectroscopy was conducted on a JEOL FA200 SER spectrometer with a frequency range of 8 to 10 GHz (X-Band) and 5.0 mg of sample. After $Fe^{3+}$-doping, two new ESR signals emerged. The first, at 153.7 mT, belongs to the $Fe^{3+}$ in Fe-Py-1P. The other signal, at 329.3 mT with remarkably high intensity and a g factor value of 2.0031, suggests the presence of carbon radicals. Without being bound by any particular theory, this is possibly due to the electron transfer between COF adjacent layers facilitated by $Fe^{3+}$-doping. Spectrum 830 will be discussed in connection with Example 3 below.

Examples 2B and 2C—Metal Ion-doping of Py-TT and Py-Py

As shown in Example 1B and Example 1C, Py-TT and Py-Py COFs with high crystallinity were synthesized by the condensation of 1,3,6,8-tetrakis(4-aminophenyl)pyrene with thieno[3,2-b]thiophene-2,5-dicarbaldehyde and 4,4',4",4'"-(pyrene-1,3,6,8-tetrayl)tetraaniline, respectively. Samples of metal ion-doped Py-TT and Py-Py were prepared in a manner similar to the preparation of metal ion doped Py-1P. Similar to Py-1P, the color of Py-TT and Py-Py changed from yellow to black after doping with $FeCl_3$, and the optical band gap reduced accordingly. Additionally, BET surface area, pore size, PXRD and FTIR further proved the successful doping of these COFs. The $Fe^{3+}$ contents in Py-TT-$FeCl_3$ and Py-Py-$FeCl_3$ determined by ICP-MS were 3.24 wt. % and 1.71%, corresponding to $Fe^{3+}$/N ratios of 0.12 and 0.086, respectively.

Figure 9:
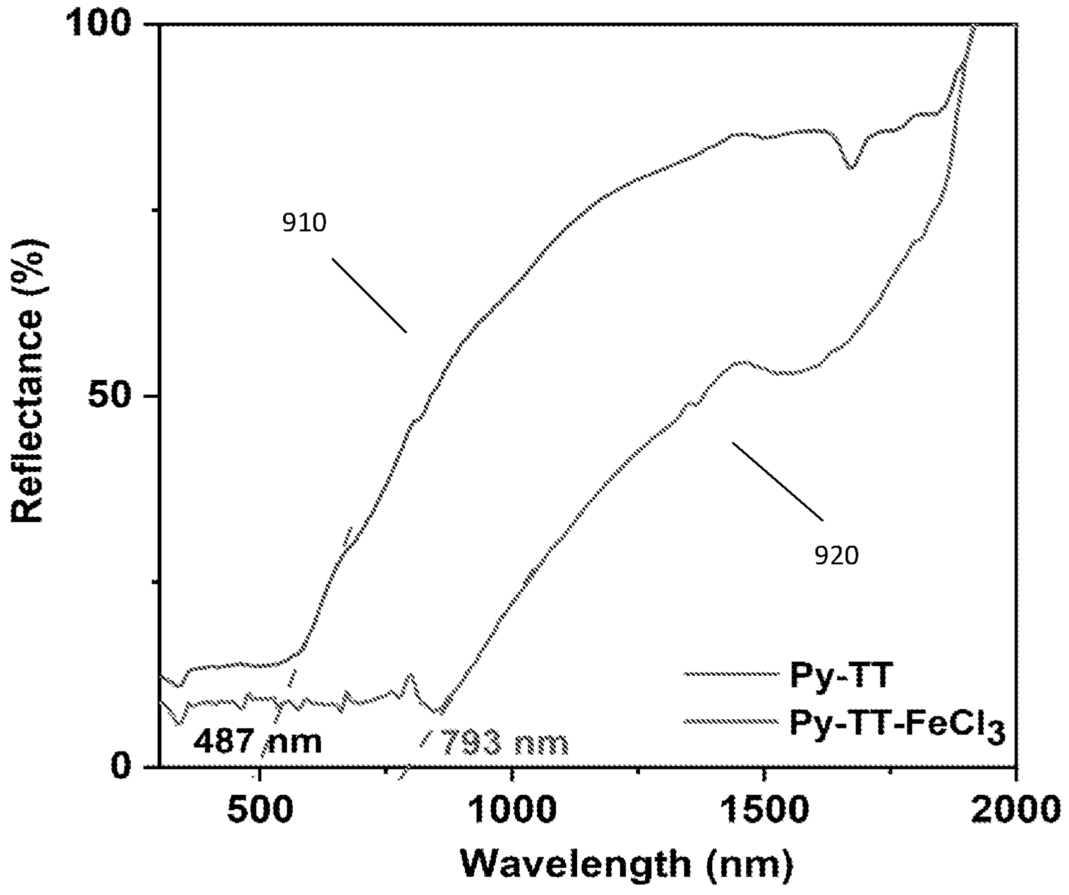
FIG. 9 shows UV-Vis spectra for undoped and doped Py-TT.
Figure 10:
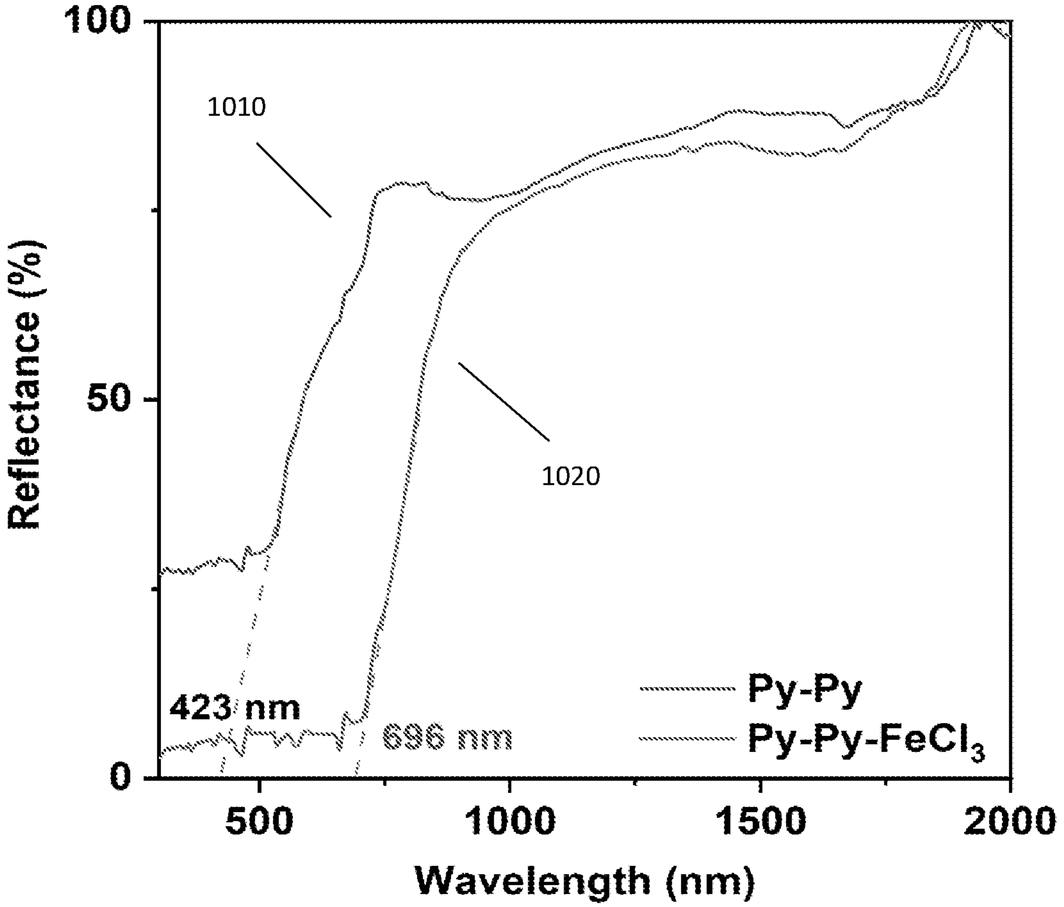
FIG. 10 shows UV-Vis spectra for undoped and doped Py-Py.

UV-Vis spectroscopy was also performed on undoped and Fe-doped Py-TT and Py-Py to determine the bandgap. FIG. 9 shows the UV-Vis spectra for undoped Py-TT (910) and Py-TT-$FeCl_3$ (920). Based on the UV-Vis spectra, the bandgap for undoped Py-TT was calculated to be 1.95 eV, while the bandgap for Py-TT-$FeCl_3$ was 1.26 eV. Similarly, FIG. 10 shows UV-Vis spectra for undoped Py-Py (1010) and Py-Py-$FeCl_3$ (1020). Based on the UV-Vis spectra, the bandgap for Py-Py was calculated to be 2.71 eV, while the bandgap for Py-Py-$FeCl_3$ was 1.86 eV.

Example 3—Reversibility of Metal Doping

Figure 11:
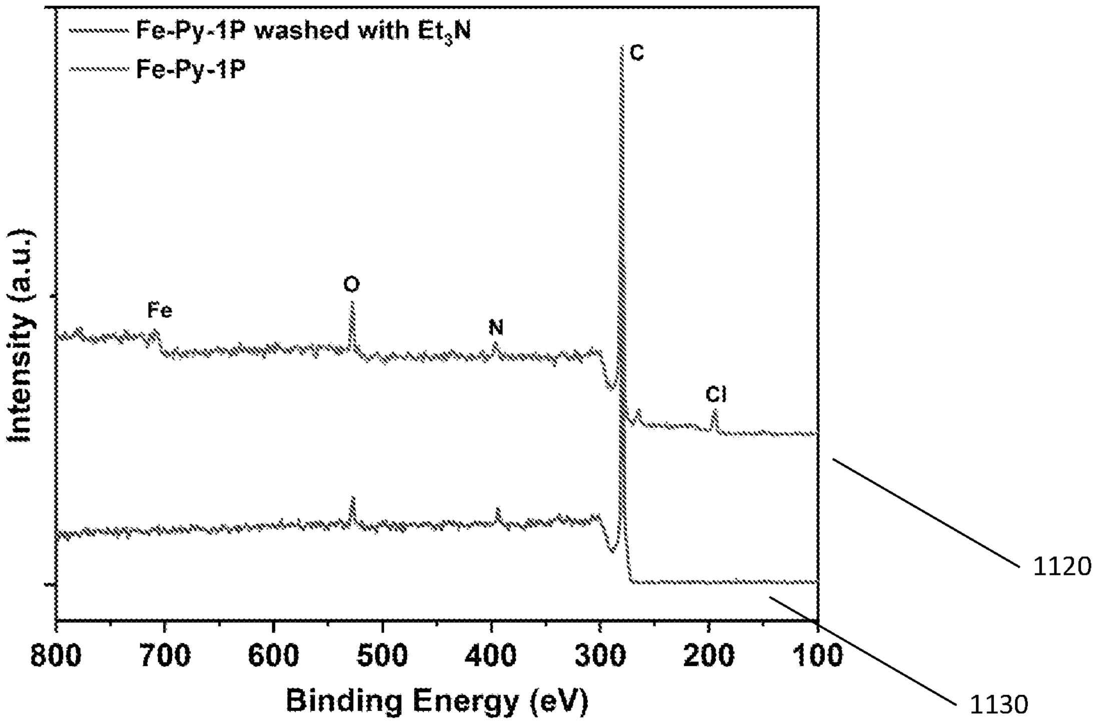
FIG. 11 shows X-ray photoelectron spectroscopy (XPS) spectra for various samples.

Metal ion-doping is reversible, and adding strong electron-donating reagents (e.g., 5 vol % trimethylamine in ethanol) to the metal ion-doped Py-1P COF changed its color from deep black back to yellow, indicating that metal ions were removed from the Py-1P. The de-doped Py-1P was further washed three times with ethanol containing 5 vol % trimethylamine and subsequently washed extensively with pure ethanol to remove the Fe-$Et_3N$ complex no longer attached to the COF framework. Spectrum 730 in FIG. 7 shows the FTIR spectrum for de-doped Py-1P after removal of the $Fe^{3+}$. As shown in FIG. 7, the imine bond IR stretch (indicated by an arrow) reverts to its original position near 1621 $cm^{-1}$, as seen in both spectrum 710 (prior to doping) and spectrum 730 (metal-free Py-1P after washing). It is noted that the (001) peak in the PXRD pattern for the metal-free Py-1P after washing similarly reverts to the location of the (001) peak from the Py-1P material prior to metal doping. Similarly, FIG. 11 provides XPS spectra showing that washing with ethanol/trimethylamine results in removal of the Fe ions. In FIG. 11, spectrum 1120 corresponds to Fe-Py-1P. In spectrum 1120, peaks for both Fe and the counterion Cl are visible. Spectrum 1130 shows the XPS spectrum for the Py-1P material after washing to remove Fe. As shown in spectrum 1130, the peaks corresponding to Fe and Cl are no longer present after the wash in ethanol/trimethylamine. Additionally, it is believed that the ethanol and trimethylamine can be readily removed from the COF, so that after washing the COF is substantially in a state similar to the COF prior to any metal addition.

Figure 12:
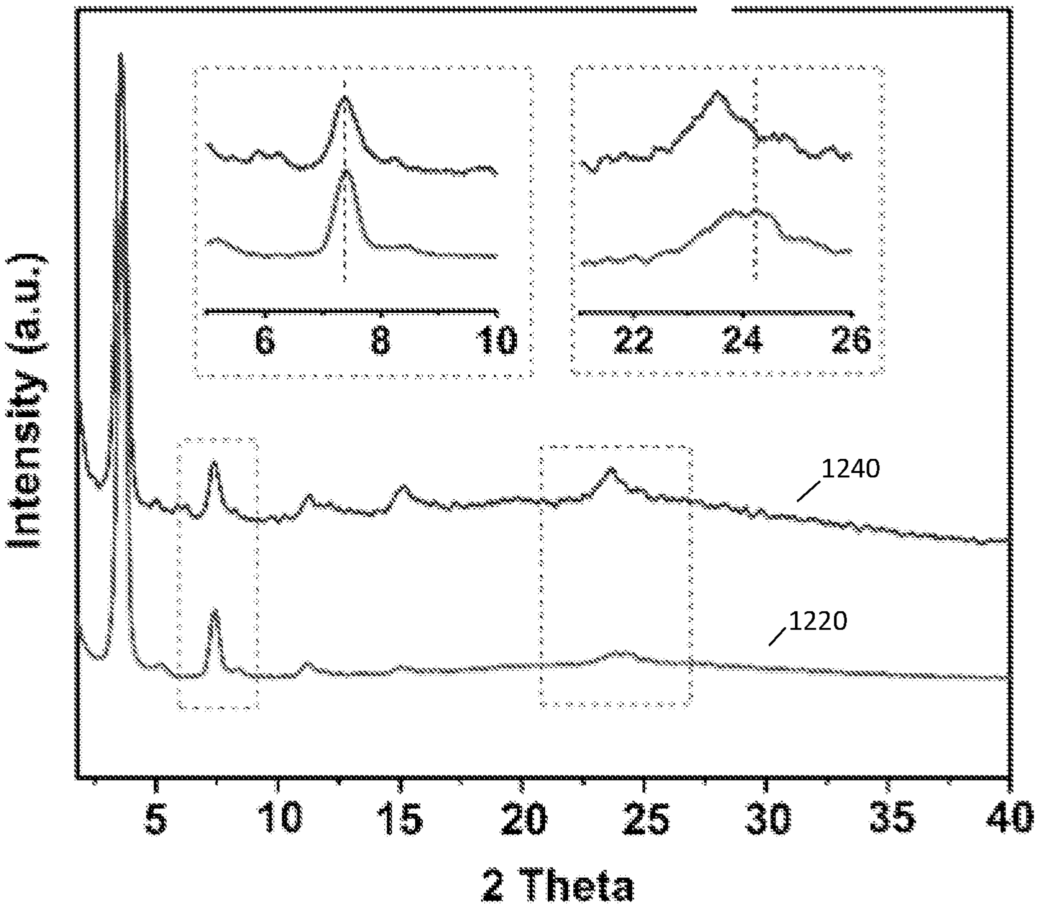
FIG. 12 shows PXRD spectra for various samples.

The ability to remove and add metal ion dopants multiple times is further confirmed by other observations of the material. It is noted that the color change caused by adding metals to Py-1P is reversible. For example, Py-1P initially has an orange color. When Fe is added as a metal ion-dopant to Py-1P, the color changes from orange to black. When the Fe is removed by washing, such as by washing in ethanol and trimethylamine, the initial orange color of the Py-1P is restored. This ability to successively add and remove metals is further confirmed by PXRD spectra of materials after various addition and removal processes. FIG. 12 shows PXRD spectra of Py-1P (1210), Fe-Py-1P (1220), and Py-1P formed by washing Fe-Py-1P to remove the metals. The inset in FIG. 12 shows an expanded view of the portions of the spectra that show the (001) peak. As shown in FIG. 12, addition of iron to form Fe-Py-1P (1220) causes the (001) peak to shift relative to Py-1P (1210). After washing to remove the iron (1230), the (001) peak of the washed Py-1P sample returns to substantially the original position.

Figure 13:
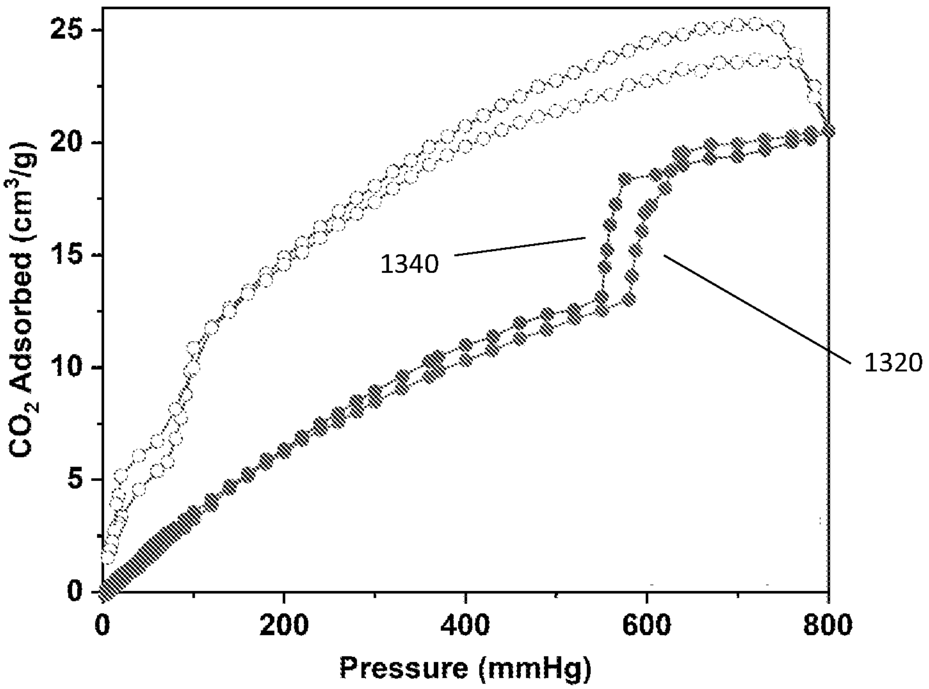
FIG. 13 shows $CO_2$ sorption isotherms for various samples.

In addition to being able to remove metals, it has further been discovered that new metals can be added again while retaining a substantially similar sorption profile for a component such as $CO_2$. FIG. 13 shows $CO_2$ sorption isotherms for two types of Fe-Py-1P materials. Sorption isotherm 1320 corresponds to Fe-Py-1P formed by metal ion doping of a fresh Py-1P sample. Sorption isotherm 1340 corresponds to Fe-Py-1P formed by the following sequences: Metal ion doping of fresh Py-1P; Removal of metal ions using an ethanol/trimethylamine wash; Metal ion doping of the washed sample. (The desorption isotherms are also shown in FIG. 13.) As shown in FIG. 13, the sorption isotherms for the two materials are substantially similar. While the exact pressure of the step in the sorption isotherm varies slightly, FIG. 13 illustrates that multiple metal ion doping and removal steps can be performed on a COF material while still producing a metal ion doped material retaining enhanced sorption properties.

Figure 14:
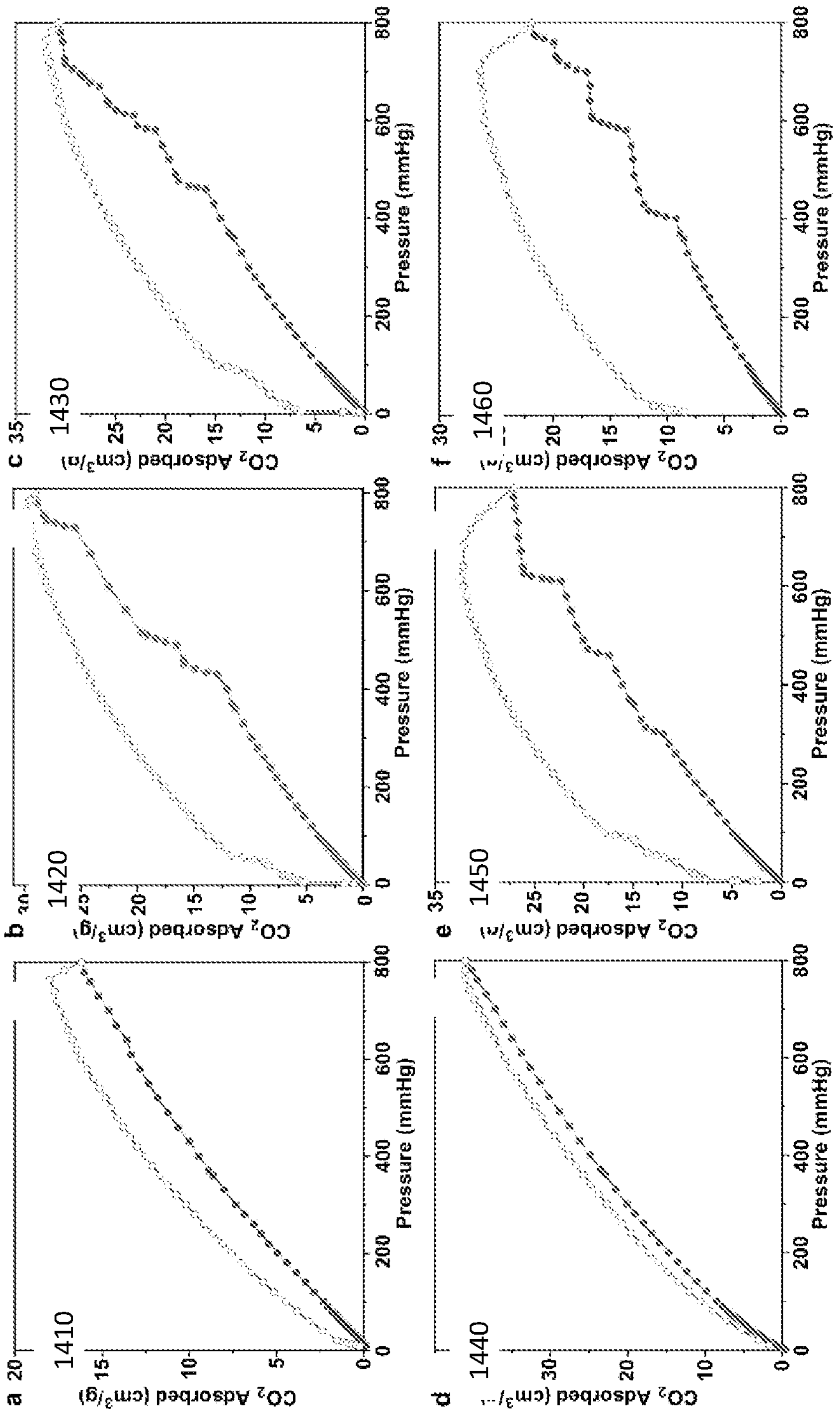
FIG. 14 shows $CO_2$ sorption isotherms for various covalent organic framework materials.

Example 4—$CO_2$ Sorption with Metal-doped COFs Compared to Undoped COF $CO_2$ sorption measurements under different temperatures were performed for Fe-Py-1P using the Micromeritics instrument and pre-treatment protocol previously described. The maximum increment of each point in $CO_2$ adsorption was set as 1.0 $cm^3/g$ during the measurement. The various sorption measurements are shown in FIG. 14.

In the sorption measurement shown in box 1410, regular and smooth $CO_2$ sorption isotherm was observed in the $CO_2$ sorption with pure Py-1P as adsorbent at 298 K, with a $CO_2$ uptake of 16.2 $cm^3/g$ at 800 mmHg (107 kPa). Under the same conditions, however, several sharp $CO_2$ adsorption steps were unexpectedly observed in Py-1P COF doped with $In^{3+}$ at 429.6, 489.4, and 729.6 mmHg (~57, 65, and 97 kPa) (box 1420 in FIG. 14); $Cr^{3+}$ at 459.7, 580.2, and 669.7 mmHg (~61, 77, and 89 kPa) (box 1430 in FIG. 14); and $Fe^{3+}$ at 299.9, 459.6, and 610.2 mmHg (~40, 61, and 81 kPa) (box 1450). $CO_2$ desorption steps were also observed in their desorption isotherms. Due to the stepwise isotherms, the $CO_2$ uptake capacities of the $In^{3+}$ (29.1 $cm^3/g$), $Cr^{3+}$ (30.7 $cm^3/g$), and $Fe^{3+}$ (27.2 $cm^3/g$) doped Py-1P are 79.6%, 89.5%, and 67.9% higher than that of the pure Py-1P (16.2 $cm^3/g$), respectively.

Fe-Py-1P was used as an example to examine the influence of temperature on $CO_2$ sorption. Three steps appear at 299.9, 459.6, and 610.2 mmHg (~40, 61, and 81 kPa) in the $CO_2$ adsorption isotherm of the Fe-Py-1P at 298 K (box 950). All these steps shift toward higher pressures (399.8, 580.4, and 699.6 mmHg, or 53, 77, and 93 kPa) at 313 K (box 1460). In contrast, the $CO_2$ adsorption isotherm at 273 K (box 1440) exhibits a normal physisorption behavior without any steps. Thus, process temperature can be used to control the position of the step isotherm.

Figure 15:
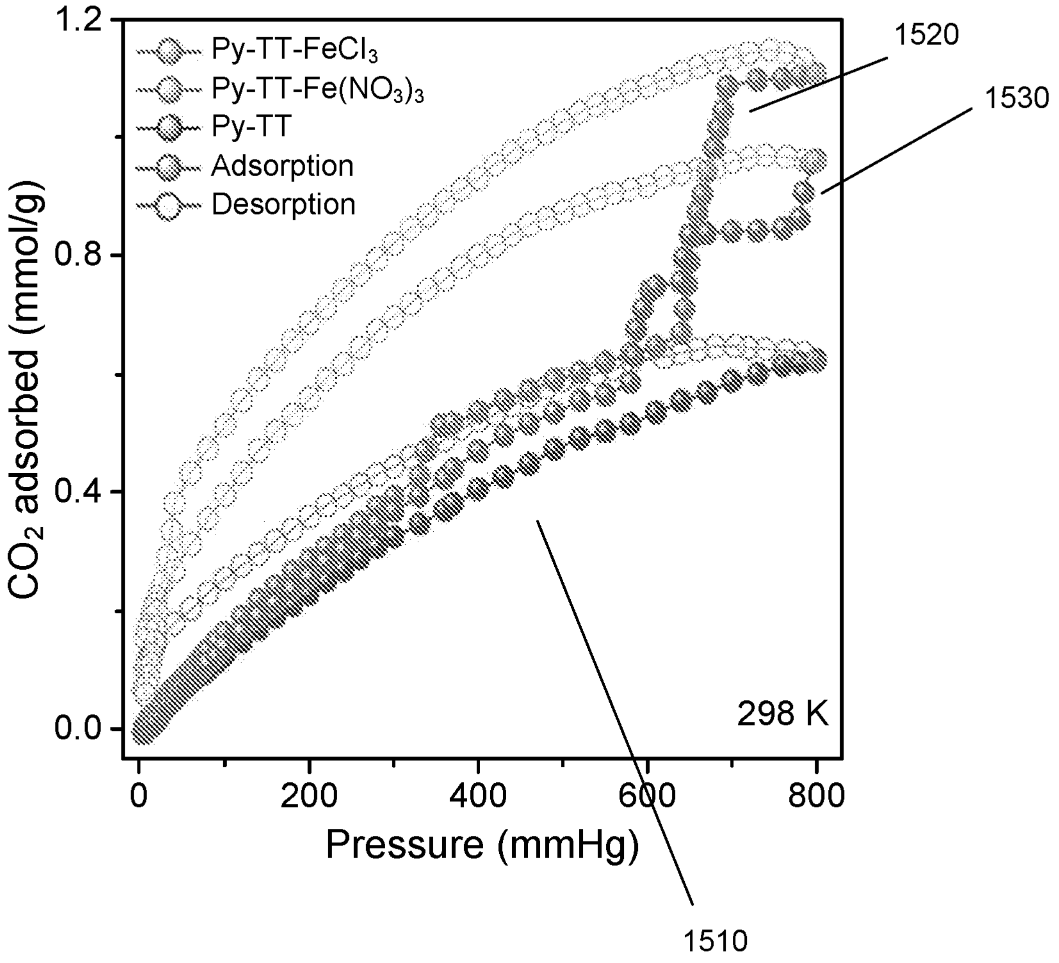
FIG. 15 shows sorption isotherms for undoped and doped Py-TT.
Figure 16:
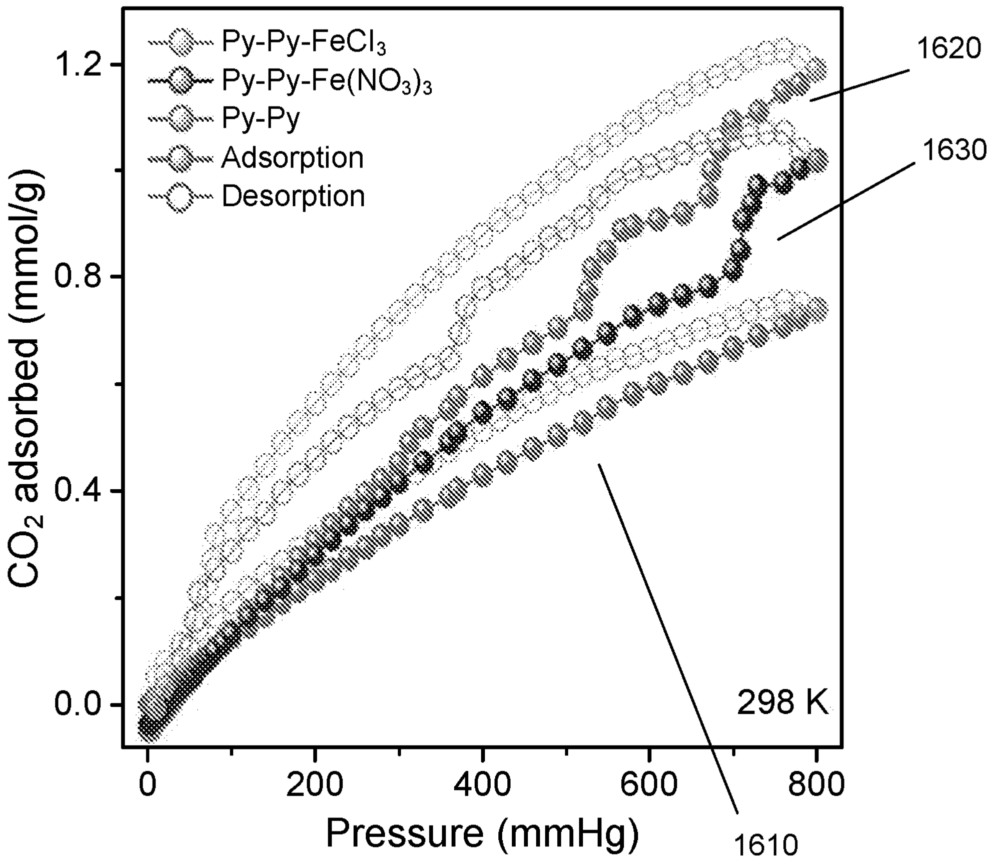
FIG. 16 shows sorption isotherms for undoped and doped Py-Py.

Sorption isotherms were also obtained to compare undoped Py-TT and Py-Py with Fe doped Py-TT and Fe doped Py-Py. FIG. 15 shows sorption isotherms for Py-TT (1510), Py-TT-$FeCl_3$ (1520), and Py-TT-$Fe(NO_3)_3$ (1530). FIG. 16 shows sorption isotherms for Py-Py (1610), Py-Py-$FeCl_3$ (1620), and Py-Py-$Fe(NO_3)_3$ (1630). (The desorption isotherms for the metal doped COFs are also shown in FIG. 15 and FIG. 16.) Compared to the smooth and reversible $CO_2$ adsorption isotherm of Py-TT (0.62 mmol/g) and Py-Py (0.74 mmol/g), Py-TT-$FeCl_3$ and Py-Py-$FeCl_3$ have stepwise isotherms with $CO_2$ capture amount 79.0% (1.11 mmol/g) and 59.5% (1.18 mmol/g) higher than their pure COF counterparts. Py-TT-$Fe(NO_3)_3$ and Py-Py-$Fe(NO_3)_3$ also show increased $CO_2$ capture amount relative to the pure COFs.

It is further noted that in addition to changing the capture amount, changing the counter-ion from Cl to $NO_3$ resulted in a change in the position of the steps for the $CO_2$ sorption isotherm in FIG. 15 and FIG. 16. This demonstrates that changing the counter-ion can be used to modify the location of the step in the isotherm. A similar effect was observed when changing the counter-ion for Fe-Py-1P. This observation can possibly be explained by the fact that $Cl^-$ has stronger affinity for $Fe^{3+}$ than that of the $NO_3^-$, therefore, the $Fe^{3+}$ in $FeCl_3$ doped COFs are more tightly bonded to $Cl^-$ and enjoy less freedom to interact with N in the COF, resulting in weaker $Fe^{3+}$/N interactions that favor $CO_2$ insertion, therefore, $CO_2$ adsorption steps appear at lower pressure.

Figure 17:
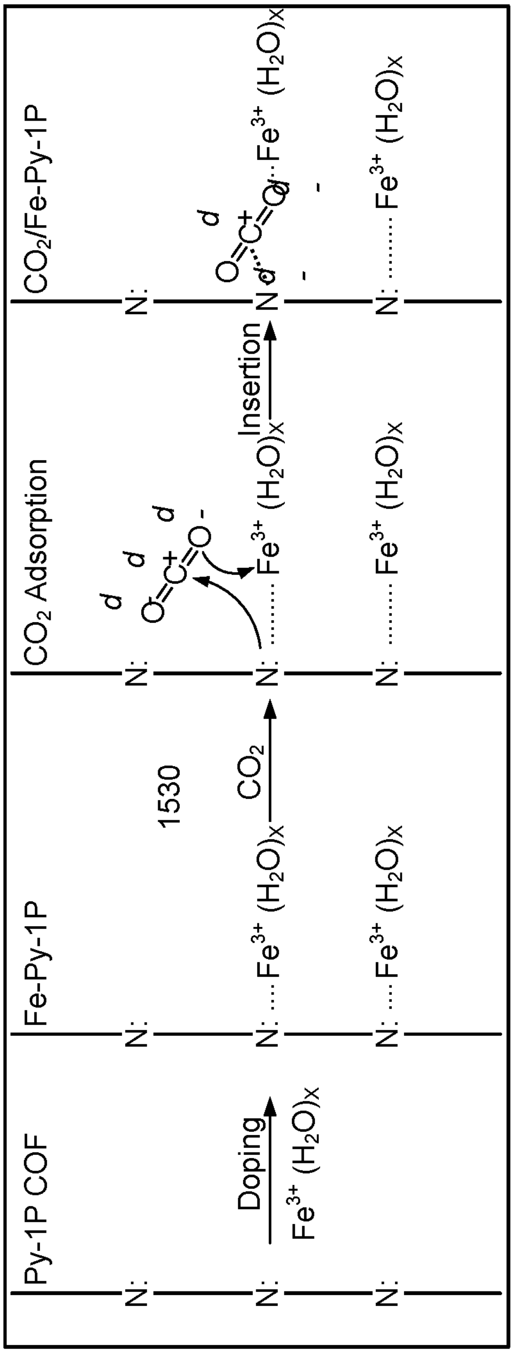
FIG. 17 illustrates a proposed mechanism for $CO_2$ sorption in a metal ion-doped covalent organic framework material.

Example 5—Demonstration of Nature of Enhanced Sorption Interaction of Fe-Py-1P $CO_2$ Sorption The presence of $CO_2$ does not significantly change the structural features of Fe-Py-1P, such as pore size and interlayer stacking. Without being bound by any particular theory, it is believed that an enhanced sorption interaction occurs based on insertion of $CO_2$ molecules between the N atom of the imine bond and the metal ion (such as $Fe^{3+}$). An illustration of a proposed mechanism responsible for the stepwise isotherms is shown in FIG. 17. In this mechanism, $CO_2$ molecules insert between N atom of the imine bond and $Fe^{3+}$.

Figure 18:
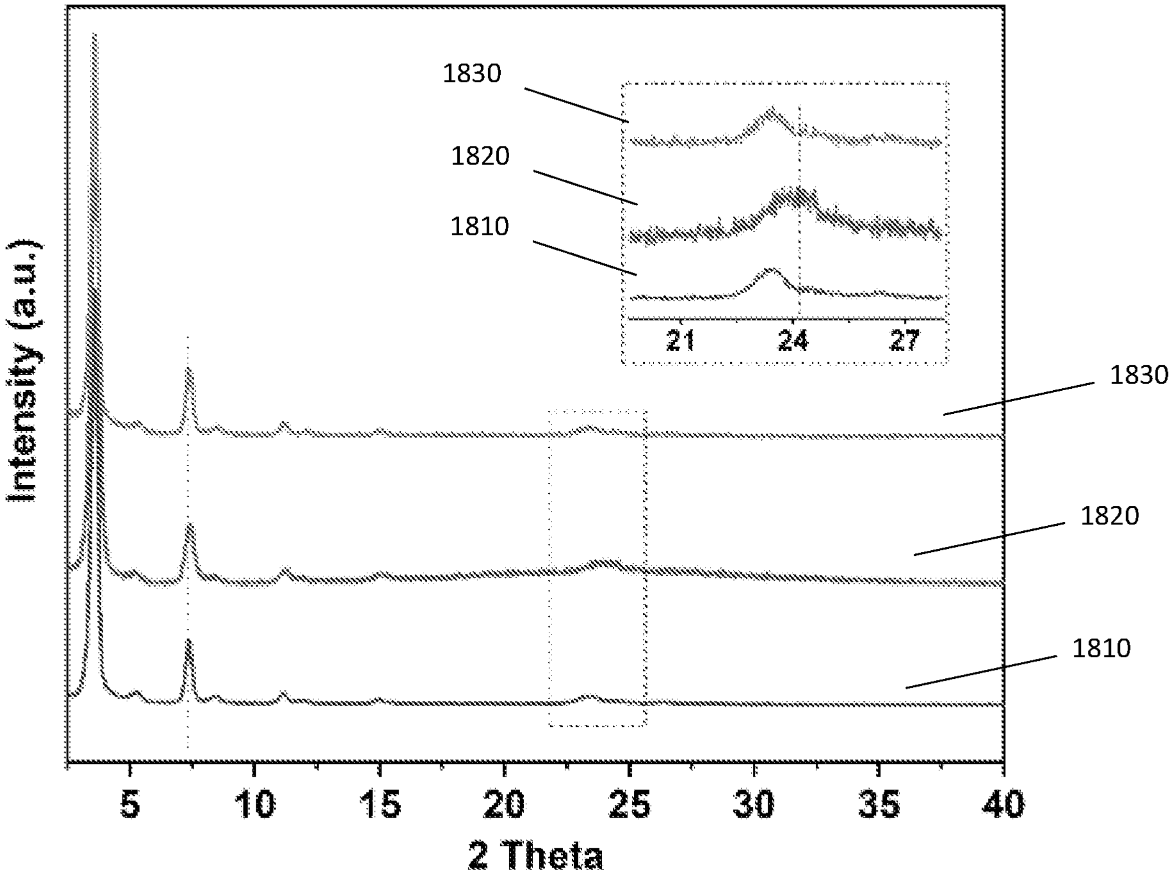
FIG. 18 shows PXRD data for Fe-Py-1P and $CO_2$/Fe-Py-1P.

Further support for the proposed mechanism in FIG. 17 is provided by additional characterization of $CO_2$/Fe-Py-1P. For example, FIG. 18 shows in-situ PXRD spectra for Fe-Py-1P (1820) and $CO_2$/Fe-Py-1P (1840). As shown in FIG. 18, PXRD measurement of Fe-Py-1P under $CO_2$ ("$CO_2$/Fe-Py-1P") at 298 K showed a similar pattern to that for Fe-Py-1P, with identical 2θ values for most phases except for (001). The (001) phase in $CO_2$/Fe-Py-1P has a 2θ value of 23.6° compared to 24.1° for Fe-Py-1P, indicating an increased interlayer distance. Without being bound by any particular theory, this suggests that $CO_2$ weakens the interaction between Py-1P and $Fe^{3+}$ by a specific mechanism which may be responsible for the stepwise $CO_2$ sorption isotherms.

Figure 19:
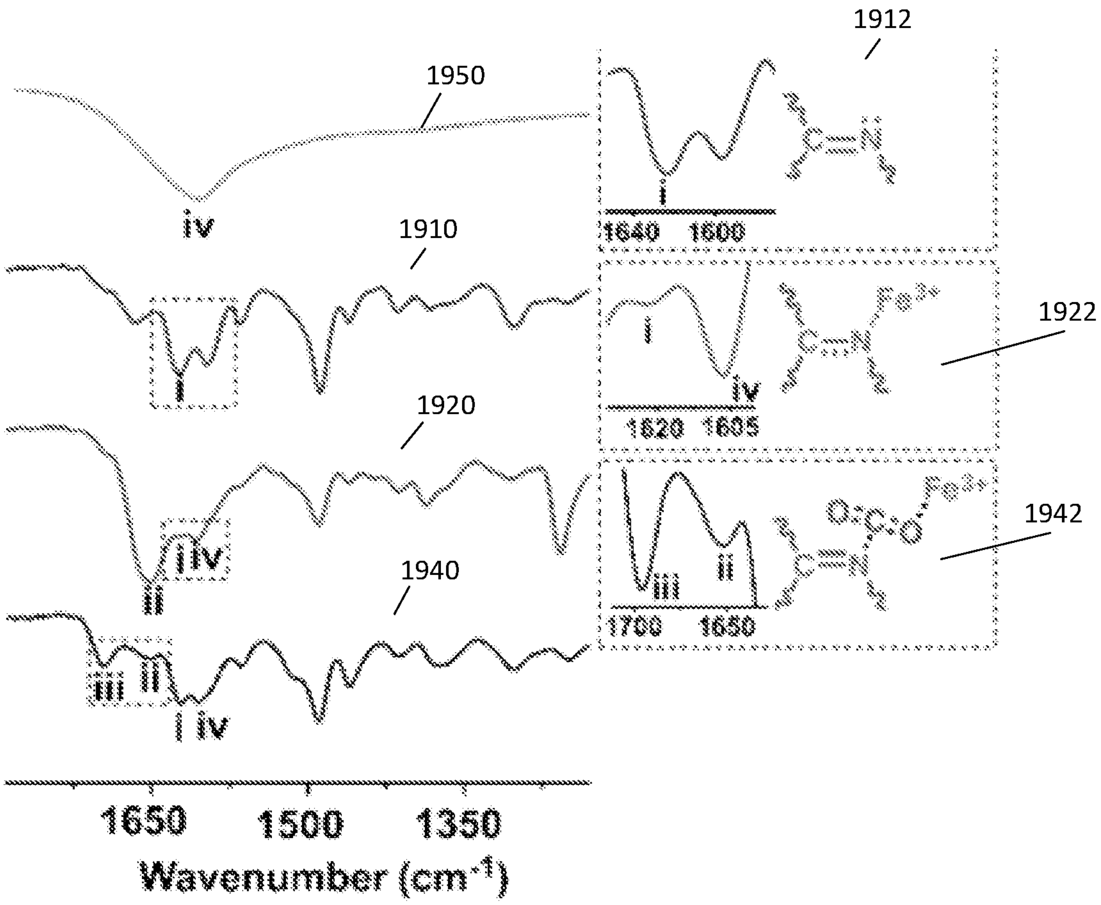
FIG. 19 shows FTIR spectra for various covalent organic framework materials.

FIG. 19 shows FTIR spectra at 298 K for $FeCl_3$ (1950), Py-1P COF (1910), Fe-Py-1P (1920), and $CO_2$/Fe-Py-1P (1940). Additional insets are also included in FIG. 19 to highlight certain features within the spectra. Inset 1912 provides a magnified view of the portion of spectrum 1910 indicated by the dotted line box. Similarly, inset 1922 provides a magnified view of a portion of spectrum 1920. Inset 1942 provides a magnified view of a portion of spectrum 1940. Compared with the Fe-Py-1P spectrum 1920, the 298 K FTIR spectrum of $CO_2$/Fe-Py-1P (1940) showed significantly reduced signal intensity of the imine stretch at 1651.1 $cm^{-1}$, indicating that $CO_2$ weakens the $Fe^{3+}$-imine bond interaction. The original imine stretch observed from Py-1P also reappears, although it is shifted to 1621.1 $cm^{-1}$ in spectrum 1940 (compared to 1624.2 $cm^{-1}$ in spectrum 1910 for pure Py-1P). This further confirms loss of the $Fe^{3+}$/N interaction. The slight wavenumber shifting of the imine bond from that for pure Py-1P suggests a new imine-$CO_2$ interaction. Additionally, a new peak emerges at 1695.7 $cm^{-1}$ suggesting a new interaction between $CO_2$ and $Fe^{3+}$. Collectively, this suggests: (1) $CO_2$ reduces and/or breaks the $Fe^{3+}$/imine nitrogen interaction, (2) strong interactions form between $CO_2$ and $Fe^{3+}$, and (3) new interactions exist between $CO_2$ and N. Without being bound by any particular theory, it is reasonable to conclude that $CO_2$ inserts between $Fe^{3+}$ and N during sorption and generates the sharp steps in the $CO_2$ adsorption isotherms.

Without being bound by any particular theory, changes in the ESR spectrum of the Fe-Py-1P in the presence of $CO_2$ also indicate strong interactions between $CO_2$ and $Fe^{3+}$ and support an insertion mechanism. FIG. 8 shows the ESR spectra for Py-1P (810), Fe-Py-1P (820), and $CO_2$/Fe-Py-1P (830). After $CO_2$ sorption, the $Fe^{3+}$ ESR signal at 153.7 mT disappears, indicating a reduction in the number of unpaired electrons in the $Fe^{3+}$ outer orbital electron structure. This change can be attributed to strong $CO_2/Fe^{3+}$ interaction accompanied by electron transfer. The $CO_2$/Fe-Py-1P also has carbon radical signal intensity slightly stronger than that for Fe-Py-1P. Because the spectra were measured under identical conditions, this suggests insertion of $CO_2$ may generate extra carbon radicals.

Figure 20:
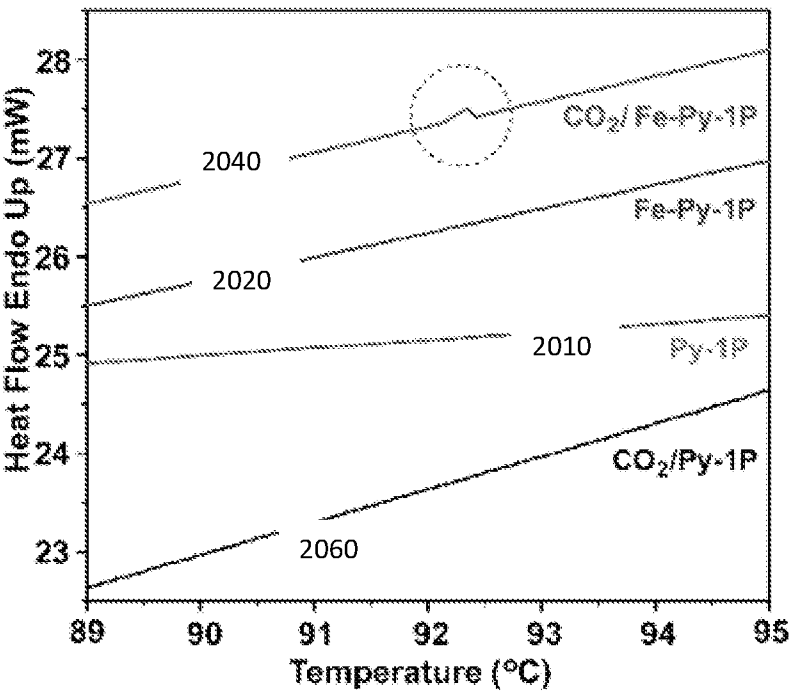
FIG. 20 shows differential scanning calorimetry data for various covalent organic framework materials.

Differential scanning calorimetry (DSC) measurements were conducted on a PerkinElmer DSC-8500 with a temperature sweep rate of 5 K/min from 273 K to 473 K (0 to 200° C.), each DSC trace was recorded during the first heat scan. FIG. 20 shows the DSC measurements for Py-1P (2010), Fe-Py-1P (2020), $CO_2$/Fe-Py-1P (2040), and $CO_2$/Py-1P (2060). Generally, desorption of chemically adsorbed gases requires the breakage of chemical bonds, which in turn is accompanied by abrupt heat fluctuation within a narrow temperature range in the DSC curve. This feature is not present with physically adsorbed gases due to weak adsorbate-adsorbent interactions. As expected, no heat fluctuation was observed in the DSC traces of pure Py-1P (2010), $CO_2$-adsorbed pure Py-1P (2060), and $CO_2$-free Fe-Py-1P (2020). In contrast, a small but clear endothermic peak was observed at 92.4° C. during the first heat scanning of the $CO_2$/Fe-Py-1P (2040). This endotherm can be attributed to desorption of the inserted (sorbed) $CO_2$, indicating some type of enhanced sorption interaction. The existence of one endotherm, rather than several, is attributed to the closely spaced nature of the individual steps of the material's $CO_2$ desorption isotherm.

Example 6—Tuning of $CO_2$ Sorption Step Isotherms Through Metal Hydration

Without being bound by any particular theory, it is believed the degree of metal ion hydration can be used to control the position of the $CO_2$ sorption step isotherm. It is believed that the multiple steps in the $CO_2$ sorption isotherms of Fe-Py-1P originate from the different binding strengths between the specific types of metal ions present and the imine N atoms of the Py-1P. A stronger metal ion-N binding strength for a particular metal center means the $CO_2$ insertion will be more difficult and the adsorption step will appear at a higher pressure. It is further believed that the metal ion-N bond strength is influenced by the number of water molecules adsorbed on the metal ion. Greater hydration provides a weaker interaction between the metal ion and the N atom because adsorbed water molecules serve as a Lewis bases and weaken the coordinative bond between the metal ion and N atom. This facilitates $CO_2$ insertion and shifts the $CO_2$ sorption steps toward lower pressure.

Figure 21:
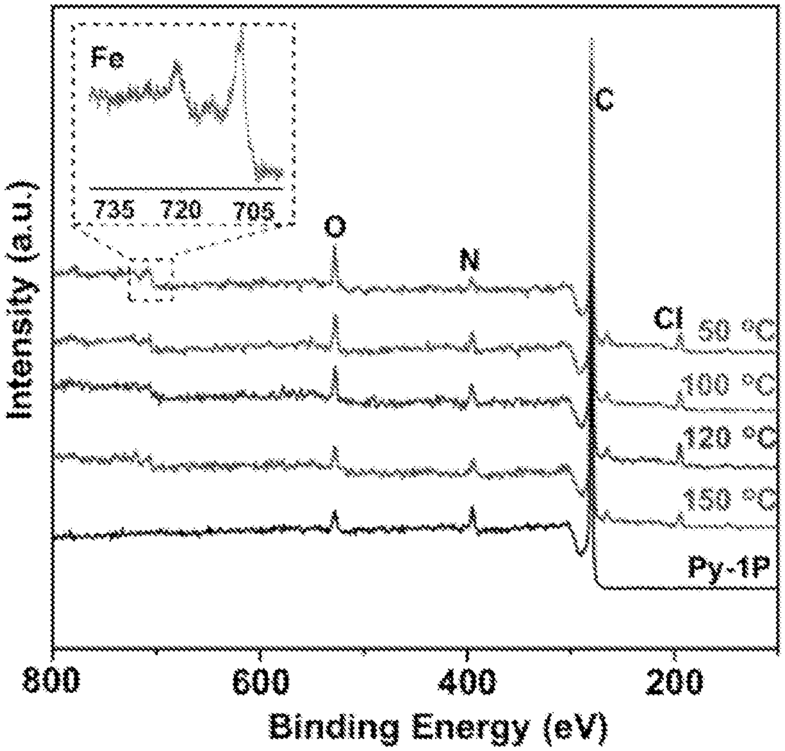
FIG. 21 shows X-ray photoelectron spectroscopy (XPS) spectra for covalent organic framework materials at various temperatures.

The amount of adsorbed water in Fe-Py-1P, and thus the sorption steps of the $CO_2$ isotherm, can be tuned by activating Fe-Py-1P at different temperatures. In this discussion, X-ray photoelectron spectroscopy (XPS) measurements were collected on a Kratos AXIS Ultra DLD surface analysis instrument with monochromatic Al Kα radiation (1486.71 eV) at 15 kV as the excitation source. Peak position was calibrated by shifting the C 1s (C—C bond) peak position of adventitious carbon to 284.5 eV and calibrating all other peaks accordingly. The takeoff angle of the emitted photoelectrons was 90°. The XPS measurements are shown in FIG. 21. The XPS measurements show average adsorbed water numbers of 5.7, 4.1, 3.3, and 2.8 for Fe-Py-1P samples activated at 50° C., 100° C., 120° C., and 150° C. under high vacuum, respectively.

Figure 22:
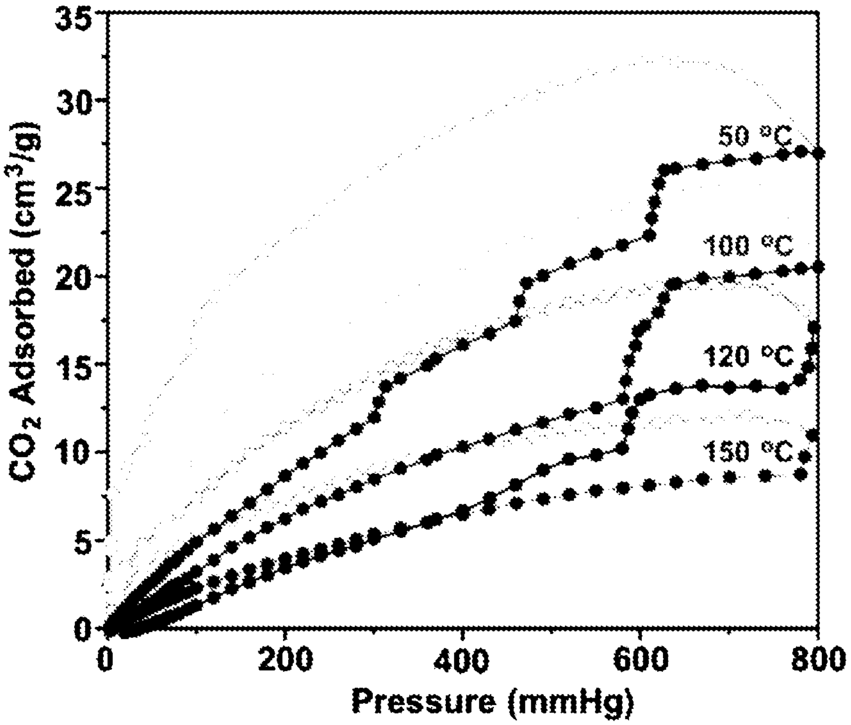
FIG. 22 shows $CO_2$ sorption isotherms for various covalent organic framework materials.
Figure 23:
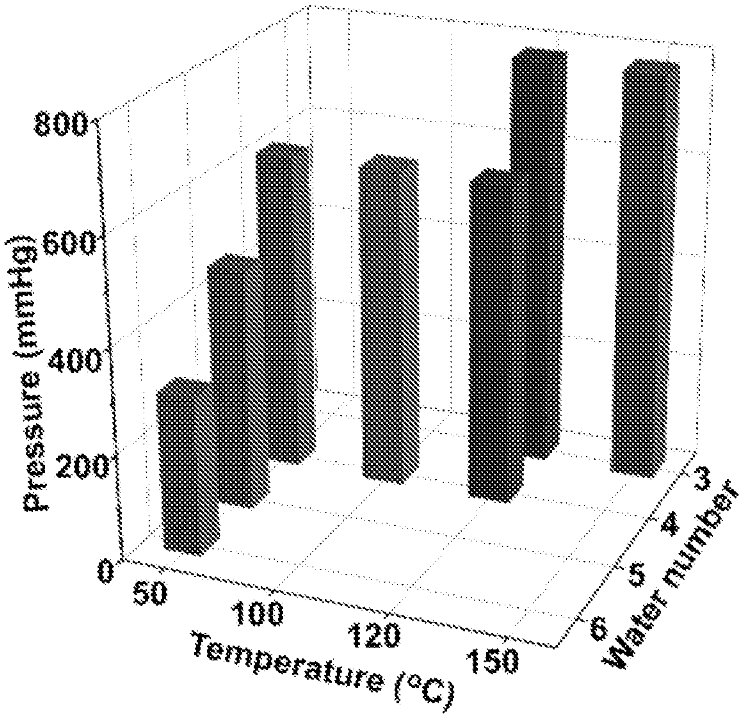
FIG. 23 illustrates waters of hydration associated with the metal ion dopants in Fe-Py-1P at various temperatures.

FIG. 22 shows $CO_2$ isotherms (298 K) collected for the samples shown in FIG. 21. Three adsorption steps were observed in the $CO_2$ sorption isotherm of the 50° C.-activated Fe-Py-1P, at 299.9, 459.6, and 610.2 mmHg, indicating three different $Fe^{3+}$—N bonding strengths, and implying $Fe^{3+}$ ions with three distinct levels of hydration. In contrast, only one sorption step (610.2 mmHg) was observed for the 100° C.-activated Fe-Py-1P suggesting that all of its $Fe^{3+}$ ions have the same number of adsorbed water molecules. Considering the XPS-calculated adsorbed water number value of 4.1, an adsorbed water number of 4 is assigned to the Fe-Py-1P activated at 100° C. Assuming that each adsorption step has a difference of one adsorbed water molecule, the adsorbed water numbers of the 50° C.-activated Fe-Py-1P can be assigned as 6, 5, and 4, respectively (corresponding to adsorption step pressures of 299.9, 459.6, and 610.2 mmHg). The adsorption step height (6.6 $cm^3/g$) at 610.2 mmHg of the 100° C.-activated Fe-Py-1P is much larger than that of the 50° C.-activated sample (3.3 $cm^3/g$), and is similar to the sum height of the latter sample's three steps (6.9 $cm^3/g$). The $Fe^{3+}$ sites in the 100° C.-activated Fe-Py-1P sample that would have had adsorbed water numbers of 6 and 5 at lower activation temperature (corresponding to adsorption steps at 299.9 and 459.6 mmHg, respectively) have been converted to $Fe^{3+}$ sites with an adsorbed water number of 4 (corresponding to the adsorption step at 610.2 mmHg). FIG. 23 illustrates the assigned adsorbed water number values at the various pressures.

It is noted that while temperature was used in this example to modify the number of adsorbed water molecules associated with metal ion-N sites, in other aspects the number of adsorbed water molecules can potentially be controlled based on exposing the composition to humidity and/or lack of humidity. It is further noted that the change in the number of adsorbed water molecules based on activation temperature is separate from the shifting of the pressure of sorption peaks shown in FIG. 14 that occurs when the temperature of a sorption process is changed.

Alternative Example 7—Amorphous Py-1P

Amorphous Py-1P was prepared by dispersing 1,3,6,8-tetrakis(4-aminophenyl)pyrene (14.0 mg, 20 μmol) and terephthalaldehyde (5.4 mg, 40 μmol) in 1,4-dioxane (1 mL), then acetic acid (0.1 mL, 6 M) was added to the mixture. The mixture was stirred at 25° C. for one day. The precipitate was collected by filtration, washed with THE, immersed in THF and ethanol respectively for three days. After being dried under a vacuum, the final COF was obtained as a yellow powder (yield: 91%). The material was then doped with $Fe^{3+}$ using a procedure identical to that given in Example 1. Amorphous Py-1P, which has no regularly stacked structure, did not show any obvious color changes after $Fe^{3+}$-doping, indicating that electron jumping between regularly stacked adjacent COF layers is the major factor for the doping-induced color change.

ADDITIONAL EMBODIMENTS

Embodiment 1. A composition comprising: a covalent organic framework comprising one or more functional groups, the one or more functional groups comprising imine, amine, pyridine, imidazole, furan, ketone, aldehyde, ether, ester, or a combination thereof; and one or more metal ions and at least one counterion having a stoichiometry within the composition of $MX_Y$, where M is the one or more metal ions, X is the at least one counterion, and Y is a) between 2.9 and 3.1, b) between 1.9 and 2.1, c) between 3.9 and 4.1, or d) between 0.9 and 1.1, the one or more metal ions comprising metal ions of Mg, Ca, Y, La, Al, Ga, In, Co, Cr, Fe, Ti, Zr, Sc, V, Mn, Ni, Cu, Zn, or a combination thereof, the composition comprising i) a molar ratio of the one or more metal ions to nitrogen of 0.005 to 0.5, ii) 1.0 wt % to 15 wt % of the one or more metal ions relative to a weight of the composition, or iii) a combination of i) and ii).

Embodiment 2. The composition of Embodiment 1, wherein the one or more functional groups comprise one or more imine functional groups.

Embodiment 3. The composition of Embodiment 2, wherein the composition further comprises a peak in an FTIR spectrum between 1635 $cm^{-1}$ and 1660 $cm^{-1}$, the covalent organic framework without the presence of the one or more metal ions optionally comprising a peak in an FTIR spectrum between 1615 $cm^{-1}$ and 1625 $cm^{-1}$.

Embodiment 4. The composition of any of the above embodiments, a) wherein the one or more metal ions comprise metal ions of Mg, Ca, Y, La, Al, Ga, In, Co, Cr, Fe, Ti, Zr, Sc, V, Mn, or a combination thereof; or b) wherein the one or more metal ions comprise metal ions of Mg, Ca, Y, La, Al, Ga, In, Co, Cr, Fe, Ti, Zr, or a combination thereof.

Embodiment 5. The composition of any of Embodiments 1 to 3, wherein Y is between 2.9 and 3.1 and wherein the one or more metal ions comprise metal ions of Al, Ga, In, Co, Cr, Fe, or a combination thereof.

Embodiment 6. A composition comprising: a covalent organic framework comprising imine functional groups; one or more metal ions and at least one counterion having a stoichiometry within the composition of $MX_Y$, where M is the one or more metal ions, X is the at least one counterion, and Y is between 2.9 and 3.1, the composition comprising i) a molar ratio of the one or more metal ions to nitrogen of 0.005 to 0.5, ii) 1.0 wt % to 15 wt % of the one or more metal ions relative to a weight of the composition, or iii) a combination of i) and ii); and $CO_2$, the composition comprising a molar ratio of $CO_2$ to the one or more metal ions between 0.01 and 1.0, the composition further comprising a peak in an FTIR spectrum between 1635 $cm^{-1}$ and 1660 $cm^{-1}$, and a peak in the FTIR spectrum between 1615 $cm^{-1}$ and 1625 $cm^{-1}$.

Embodiment 7. The composition of Embodiment 6, wherein the one or more metal ions comprise metal ions of Al, Ga, In, Co, Cr, Fe, or a combination thereof.

Embodiment 8. The composition of any of the above embodiments, wherein the at least one counterion comprises chloride, bromide, nitrate, nitrite, phosphate, perchlorate, or a combination thereof.

Embodiment 9. The composition of any of the above embodiments, wherein the composition further comprises waters of hydration; or wherein the composition comprises a surface area of 300 $cm^2/g$ or more; or a combination thereof.

Embodiment 10. The composition of any of the above embodiments, wherein the covalent organic framework comprises Py-1P, Py-TT, or Py-Py.

Embodiment 11. The composition of any of the above embodiments, wherein a framework structure of the covalent organic framework comprises the one or more functional groups; or wherein the covalent organic framework comprises a layered crystalline structure; or a combination thereof.

Embodiment 12. The composition of Embodiment 11, wherein the framework structure further comprises a functional group comprising sulfide, thieno, thienyl, or a combination thereof.

Embodiment 13. A method of sorbing a component from a gas phase flow comprising exposing the gas phase flow to a composition according to any of Embodiments 1-12, the component optionally comprising $CO_2$, $H_2S$, or a combination thereof.

Embodiment 14. A method for forming a composition, comprising: providing a covalent organic framework comprising one or more functional groups, the one or more functional groups comprising imine, amine, pyridine, imidazole, furan, ketone, aldehyde, ether, ester, or a combination thereof; adding one or more metal ions and at least one counterion to the composition to form a metal ion-doped composition, the metal ion-doped composition having a stoichiometry within the composition of $MX_Y$, where M is the one or more metal ions, X is the at least one counterion, and Y is a) between 2.9 and 3.1, b) between 1.9 and 2.1, c) between 3.9 and 4.1, or d) between 0.9 and 1.1, the one or more metal ions comprising metal ions of Mg, Ca, Y, La, Al, Ga, In, Co, Cr, Fe, Ti, Zr, Sc, V, Mn, Ni, Cu, Zn, or a combination thereof; washing the metal ion-doped composition to remove at least a portion of the one or more metal ions and at least a portion of the at least one counterion to form a washed composition; and adding one or more additional metal ions and at least one additional counterion to the composition to form a washed metal ion-doped composition, the washed metal ion-doped composition having a stoichiometry within the composition of $M^*X^*_{Y^*}$, where M* comprises the one or more additional metal ions, X* comprises the at least one additional counterion, and Y* is a) between 2.9 and 3.1, b) between 1.9 and 2.1, c) between 3.9 and 4.1, or d) between 0.9 and 1.1, the one or more additional metal ions comprising metal ions of Mg, Ca, Y, La, Al, Ga, In, Co, Cr, Fe, Ti, Zr, Sc, V, Mn, Ni, Cu, Zn, or a combination thereof; wherein i) the washed metal ion-doped composition comprises a molar ratio of the metal ions comprising M* to nitrogen of 0.005 to 0.5, ii) the washed metal ion-doped composition comprises 1.0 wt % to 15 wt % of the metal ions comprising M*, relative to a weight of the composition, or iii) a combination of i) and ii).

Embodiment 15. The method of Embodiment 14, wherein the metal ions comprising M* further comprise a remaining portion of the one or more metal ions, or wherein X* further comprises a remaining portion of the at least one counterion, or a combination thereof.

Additional Embodiment A. The method of Embodiment 15, wherein at least one of the one or more additional metal ions is different from the one or more metal ions, or wherein the at least one additional counterion is different from the at least one counterion, or a combination thereof.

Additional Embodiment B. The method of Embodiment 14, Embodiment 15, or Additional Embodiment A, a) wherein the one or more metal ions comprise metal ions of Mg, Ca, Y, La, Al, Ga, In, Co, Cr, Fe, Ti, Zr, Sc, V, Mn, or a combination thereof; or b) wherein the one or more metal ions comprise metal ions of Mg, Ca, Y, La, Al, Ga, In, Co, Cr, Fe, Ti, Zr, or a combination thereof.

Additional Embodiment C. The method of Embodiment 14, Embodiment 15, or Additional Embodiment A, i) wherein Y is between 2.9 and 3.1 and wherein the one or more metal ions comprise metal ions of Al, Ga, In, Co, Cr, Fe, or a combination thereof; ii) wherein Y* is between 2.9 and 3.1 and wherein the one or more additional metal ions comprise metal ions of Al, Ga, In, Co, Cr, Fe, or a combination thereof; or iii) a combination of i) and ii).

Additional Embodiment D. The composition of any of Embodiments 1-13, wherein the at least one counterion does not comprise hydroxide, or wherein the at least one counterion does not comprise acetate, or a combination thereof.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention

What is claimed is:

1. A composition comprising: a covalent organic framework comprising one or more functional groups, the one or more functional groups comprising imine; and one or more metal ions and at least one counterion having a stoichiometry within the composition of $MX_Y$, where M is the one or more metal ions, X is the at least one counterion, and Y is a) between 2.9 and 3.1, b) between 1.9 and 2.1, c) between 3.9 and 4.1, or d) between 0.9 and 1.1, the one or more metal ions comprising metal ions of Mg, Ca, Y, La, Al, Ga, In, Co, Cr, Fe, Ti, Zr, Sc, V, Mn, or a combination thereof, the composition comprising i) a molar ratio of the one or more metal ions to nitrogen of 0.005 to 0.5, ii) 1.0 wt % to 15 wt % of the one or more metal ions relative to a weight of the composition, or iii) a combination of i) and ii), wherein the one or more metal ions form a bonding complex with imine from the one or more functional groups.

2. The composition of claim 1, wherein Y is between 2.9 and 3.1 and wherein the one or more metal ions comprise metal ions of Al, Ga, In, Co, Cr, Fe, or a combination thereof.

3. The composition of claim 1, wherein the at least one counterion comprises chloride, bromide, nitrate, nitrite, phosphate, perchlorate, or a combination thereof.

4. The composition of claim 1, wherein the composition further comprises waters of hydration.

5. The composition of claim 1, wherein the covalent organic framework comprises Py-1P, Py-TT, or Py-Py.

6. The composition of claim 1, wherein the composition comprises a surface area of 300 $cm^2/g$ or more.

7. The composition of claim 1, wherein the framework structure further comprises a functional group comprising sulfide, thieno, thienyl, or a combination thereof.

8. The composition of claim 1, wherein the covalent organic framework comprises a layered crystalline structure.

9. A composition comprising: a covalent organic framework comprising imine functional groups, a framework structure of the covalent organic framework comprising the imine functional groups; one or more metal ions and at least one counterion having a stoichiometry within the composition of $MX_Y$, where M is the one or more metal ions, X is the at least one counterion, and Y is between 2.9 and 3.1, the composition comprising i) a molar ratio of the one or more metal ions to nitrogen of 0.005 to 0.5, ii) 1.0 wt % to 15 wt % of the one or more metal ions relative to a weight of the composition, or iii) a combination of i) and ii); and $CO_2$, the composition comprising a molar ratio of $CO_2$ to the one or more metal ions between 0.01 and 1.0, the composition further comprising a peak in an FTIR spectrum between 1635 $cm^{-1}$ and 1660 $cm^{-1}$, and a peak in the FTIR spectrum between 1615 $cm^{-1}$ and 1630 $cm^{-1}$.

10. A method for forming a composition, comprising: providing a covalent organic framework comprising one or more functional groups, the one or more functional groups comprising imine, wherein a framework structure of the covalent organic framework comprises the one or more functional groups; adding one or more metal ions and at least one counterion to the composition to form a metal ion-doped composition, the metal ion-doped composition having a stoichiometry within the composition of $MX_Y$, where M is the one or more metal ions, X is the at least one counterion, and Y is a) between 2.9 and 3.1, b) between 1.9 and 2.1, c) between 3.9 and 4.1, or d) between 0.9 and 1.1, the one or more metal ions comprising metal ions of Mg, Ca, Y, La, Al, Ga, In, Co, Cr, Fe, Ti, Zr, Sc, V, Mn, or a combination thereof; washing the metal ion-doped composition to remove at least a portion of the one or more metal ions and at least a portion of the at least one counterion to form a washed composition; and adding one or more additional metal ions and at least one additional counterion to the composition to form a washed metal ion-doped composition, the washed metal ion-doped composition having a stoichiometry within the composition of $M^*X^*_{Y^*}$, where M* comprises the one or more additional metal ions, X* comprises the at least one additional counterion, and Y* is a) between 2.9 and 3.1, b) between 1.9 and 2.1, c) between 3.9 and 4.1, or d) between 0.9 and 1.1, the one or more additional metal ions comprising metal ions of Mg, Ca, Y, La, Al, Ga, In, Co, Cr, Fe, Ti, Zr, Sc, V, Mn, Ni, Cu, Zn, or a combination thereof; wherein i) the washed metal ion-doped composition comprises a molar ratio of the metal ions comprising M* to nitrogen of 0.005 to 0.5, ii) the washed metal ion-doped composition comprises 1.0 wt % to 15 wt % of the metal ions comprising M*, relative to a weight of the composition, or iii) a combination of i) and ii), wherein the one or more metal ions form a bonding complex with imine from the one or more functional groups.

11. The method of claim 10, the metal ions comprising M* further comprises a remaining portion of the one or more metal ions.

12. The method of claim 10, wherein X* further comprises a remaining portion of the at least one counterion.

13. The method of claim 10, i) wherein Y is between 2.9 and 3.1 and wherein the one or more metal ions comprise metal ions of Al, Ga, In, Co, Cr, Fe, or a combination thereof; ii) wherein Y* is between 2.9 and 3.1 and wherein the one or more additional metal ions comprise metal ions of Al, Ga, In, Co, Cr, Fe, or a combination thereof; or iii) a combination of i) and ii).

14. A method for sorbing a component from a fluid, comprising: exposing a fluid to a sorbent material, the sorbent material comprising: a covalent organic framework comprising one or more functional groups, the one or more functional groups comprising imine, wherein a framework structure of the covalent organic framework comprises the one or more functional groups; and one or more metal ions and at least one counterion having a stoichiometry within the composition of $MX_Y$, where M is the one or more metal ions, X is the at least one counterion, and Y is a) between 2.9 and 3.1, b) between 1.9 and 2.1, c) between 3.9 and 4.1, or d) between 0.9 and 1.1, the one or more metal ions comprising metal ions of Mg, Ca, Y, La, Al, Ga, In, Co, Cr, Fe, Ti, Zr, Sc, V, Mn, Ni, Cu, Zn, or a combination thereof, the composition comprising i) a molar ratio of the one or more metal ions to nitrogen of 0.005 to 0.5, ii) 1.0 wt % to 15 wt % of the one or more metal ions relative to a weight of the composition, or iii) a combination of i) and ii), wherein the one or more metal ions form a bonding complex with imine from the one or more functional groups.

15. The method of claim 14, wherein the sorbent material comprises one or more of a membrane structure; a hollow fiber sorbent structure; a structured monolith comprising a thin-film deposited on the structured monolith, the deposited thin-film comprising the covalent organic framework; or a combination thereof.

* * * * *